United States Patent
Wang et al.

(10) Patent No.: US 10,454,711 B2
(45) Date of Patent: Oct. 22, 2019

(54) METHOD FOR OBTAINING PORT PATH AND APPARATUS

(71) Applicant: Huawei Technologies Co., Ltd., Shenzhen (CN)

(72) Inventors: Yang Wang, Shenzhen (CN); Feng Yuan, Nanjing (CN); Liang Xia, Nanjing (CN); Guang Chen, Nanjing (CN); Duoliang Fan, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 96 days.

(21) Appl. No.: 15/670,724

(22) Filed: Aug. 7, 2017

(65) Prior Publication Data
US 2017/0338976 A1 Nov. 23, 2017

Related U.S. Application Data

(63) Continuation of application No. PCT/CN2015/099216, filed on Dec. 28, 2015.

(30) Foreign Application Priority Data

Feb. 5, 2015 (CN) .......................... 2015 1 0060758

(51) Int. Cl.
*H04L 12/28* (2006.01)
*H04L 12/54* (2013.01)
(Continued)

(52) U.S. Cl.
CPC .............. *H04L 12/56* (2013.01); *H04L 45/48* (2013.01); *H04L 49/3009* (2013.01);
(Continued)

(58) Field of Classification Search
CPC ......... H04L 12/54; H04L 12/56; H04L 12/70; H04L 12/723; H04L 12/751;
(Continued)

(56) References Cited

U.S. PATENT DOCUMENTS 8,717,895 B2 * 5/2014 Koponen ............ H04L 12/4633
370/235
8,824,274 B1 9/2014 Medved et al.
(Continued)

FOREIGN PATENT DOCUMENTS

CN 102439920 A 5/2012
CN 102498694 A 6/2012
(Continued)

OTHER PUBLICATIONS

Chen et al, A Scheme to Optimize Flow Routing and Polling Switch Selection of Software Defined Networks, PLOS ONE, 22 pages, Dec. 2015.*
(Continued)

*Primary Examiner* — Frank Duong
(74) *Attorney, Agent, or Firm* — Conley Rose, P.C.

(57) ABSTRACT

A method for obtaining a port path and an apparatus to improve a network capacity, where the method includes receiving, by a controller, a request message from a first server, where the request message requests port path information, and the port path information includes a port that a logical link from the first server to a second server passes through, obtaining, by the controller, a first absolute port path (APP) and a second APP according to network topology information, where the first APP includes a port that a logical link from a root node to the first server passes through, and the second APP includes a port that a logical link from the root node to the second server passes through, obtaining, by the controller, the port path information according to the first APP and the second APP, and sending the port path information to the first server.

34 Claims, 13 Drawing Sheets

(51) Int. Cl.
*H04L 12/935* (2013.01)
*H04L 12/931* (2013.01)
*H04L 12/753* (2013.01)
*H04L 12/70* (2013.01)
*H04L 12/751* (2013.01)

(52) U.S. Cl.
CPC ............ *H04L 49/602* (2013.01); *H04L 45/02* (2013.01); *H04L 2012/562* (2013.01); *H04L 2012/5609* (2013.01); *H04L 2012/5624* (2013.01); *Y02D 30/30* (2018.01)

(58) Field of Classification Search
CPC ... H04L 12/753; H04L 12/931; H04L 12/935; H04L 45/02; H04L 45/48; H04L 49/3009; H04L 49/602; H04L 2012/5609; H04L 2012/562; H04L 2012/5624
See application file for complete search history.

(56) References Cited

U.S. PATENT DOCUMENTS

| | | | | |
|---|---|---|---|---|
| 8,953,500 | B1 * | 2/2015 | Shen | H04L 45/16 370/238 |
| 8,982,734 | B2 * | 3/2015 | Gasparakis | H04L 45/66 370/238 |
| 9,413,634 | B2 * | 8/2016 | Nadeau | H04L 45/124 |
| 2011/0261722 | A1 | 10/2011 | Awano | |
| 2011/0286326 | A1 | 11/2011 | Awano | |

FOREIGN PATENT DOCUMENTS

| | | |
|---|---|---|
| CN | 102714629 A | 10/2012 |
| CN | 104283791 A | 1/2015 |
| EP | 2747354 A1 | 6/2014 |
| EP | 2750337 B1 | 3/2017 |
| WO | 2014056863 A1 | 4/2014 |

OTHER PUBLICATIONS

Su et al, FlowCover: Low-cost Flow Monitoring Scheme in Software Defined Networks, IEEE, 6 pages, 2014.*
Machine Translation and Abstract of Chinese Publication No. CN104283791, Jan. 14, 2015, 23 pages.
"OpenFlow Switch Specification," Open Networking Foundation, Version 1.5.0 (Protocol version 0x06), Dec. 19, 2014, 277 pages.
"The Benefits of Multiple Flow Tables and TTPs," Open Networking Foundation, Version No. 1.0, ONF TR-510, Feb. 2, 2015, 9 pages.
Foreign Communication From a Counterpart Application, PCT Application No. PCT/CN2015/099216, English Translation of International Search Report dated Mar. 24, 2016, 3 pages.
Foreign Communication From a Counterpart Application, PCT Application No. PCT/CN2015/099216, English Translation of Written Opinion dated Mar. 24, 2016, 6 pages.
Foreign Communication From a Counterpart Application, European Application No. 15880990.5, Extended European Search Report dated Jan. 26, 2018, 8 pages.

* cited by examiner

METHOD FOR OBTAINING PORT PATH AND APPARATUS

CROSS-REFERENCE TO RELATED APPLICATIONS

This application is a continuation of International Patent Application No. PCT/CN2015/099216 filed on Dec. 28, 2015, which claims priority to Chinese Patent Application No. 201510060758.9 filed on Feb. 5, 2015. The disclosures of the aforementioned applications are hereby incorporated by reference in their entireties.

TECHNICAL FIELD

Embodiments of the present disclosure relate to communications technologies, and in particular, to a method for obtaining a port path and an apparatus.

BACKGROUND

As a network size becomes increasingly large, a media access control (MAC) table, a routing table, or another entry in a network device become key factors that restrain a network size. This problem is especially obvious in an ultra-large-scale data center network.

Most data center networks use a three-layer architecture, including a core layer, an aggregation layer, and an access layer. A server may access a data center network using a port of a switch located at an access layer. The switch in the data center network may forward a packet from the server using a MAC table or a routing table, that is, search the MAC table or the routing table according to information carried in the packet to obtain, from the MAC table or the routing table, a port that matches the information carried in the packet. The switch in the data center network sends the packet using the obtained port. A size of the MAC table or the routing table of the switch in the data center network depends on a chip configured in the switch in the data center network. As a result, a capacity of the data center network is limited to a specific extent.

SUMMARY

Embodiments of the present disclosure provide a method for obtaining a port path and an apparatus, to help improve a network capacity.

According to a first aspect, a method for obtaining a port path is provided, including receiving, by a controller, a request message from a first server, where the request message includes an identifier of the first server and an identifier of a second server, the request message is used to request port path information from the controller, and the port path information includes a port that a logical link from the first server to the second server passes through, obtaining, by the controller, a first absolute port path (APP) and a second APP according to network topology information, the identifier of the first server, and the identifier of the second server, where the network topology information includes information about a port connection between the first server and a first forwarding device and information about a port connection between the second server and a second forwarding device, the first forwarding device communicates with the first server, the second forwarding device communicates with the second server, the first APP includes a port that a logical link from a root node to the first server passes through, and the second APP includes a port that a logical link from the root node to the second server passes through, obtaining, by the controller, the port path information according to the first APP and the second APP, and sending, by the controller, the port path information to the first server.

In a first possible implementation of the first aspect, obtaining, by the controller, a first APP and a second APP according to the network topology information, the identifier of the first server, and the identifier of the second server includes determining, by the controller, the root node according to the network topology information, where the root node is a node serving as a root of a tree, and leaf nodes of the tree include the first forwarding device and the second forwarding device, obtaining, by the controller, information about the root node, where the information about the root node includes an identifier of the root node, a seventh port number, and an eighth port number, a port identified by the seventh port number is a port that is of the root node and that can communicate with the first server, and a port identified by the eighth port number is a port that is of the root node and that can communicate with the second server, obtaining, by the controller, the first APP according to the network topology information, the identifier of the first server, and the information about the root node, and obtaining, by the controller, the second APP according to the network topology information, the identifier of the second server, and the information about the root node.

With reference to the first possible implementation of the first aspect, a second possible implementation of the first aspect is further provided. Obtaining, by the controller, the first APP according to the network topology information, the identifier of the first server, and the information about the root node includes obtaining, by the controller, a first APP set according to the network topology information, the identifier of the first server, and the information about the root node, where the first APP set includes at least one first APP, and the at least one first APP corresponds to the first server, and selecting, by the controller, one first APP from the first APP set as the first APP.

With reference to the second possible implementation of the first aspect, a third possible implementation of the first aspect is further provided. Selecting, by the controller, one first APP from the first APP set as the first APP includes selecting, by the controller, the first APP from the first APP set according to link status information of a logical link corresponding to the at least one first APP, where the link status information is used to identify whether congestion occurs on the logical link, and the first APP does not include a congested link.

With reference to the second possible implementation of the first aspect or the third possible implementation of the first aspect, a fourth possible implementation of the first aspect is further provided. Obtaining, by the controller, the second APP according to the network topology information, the identifier of the second server, and the information about the root node includes obtaining, by the controller, a second APP set according to the network topology information, the identifier of the second server, and the information about the root node, where the second APP set includes at least one second APP, and the at least one second APP corresponds to the second server, and selecting, by the controller, one second APP from the second APP set as the second APP.

With reference to the fourth possible implementation of the first aspect, a fifth possible implementation of the first aspect is further provided. Selecting, by the controller, one second APP from the second APP set as the second APP includes selecting, by the controller, one second APP from the second APP set as the second APP according to the first APP, where the second APP and the first APP include a same port number, and the same port number is the seventh port number or the eighth port number.

With reference to the fourth possible implementation of the first aspect, a sixth possible implementation of the first aspect is further provided. Selecting, by the controller, one second APP from the second APP set as the second APP includes selecting, by the controller, N second APPs from the second APP set according to the first APP, where N is an integer greater than or equal to 1, any second APP of the N second APPs and the first APP include a same port number, and the same port number is the seventh port number or the eighth port number, and selecting, by the controller, the second APP from the N second APPs according to link status information of a logical link corresponding to the N second APPs, where the link status information is used to identify whether congestion occurs on the logical link, and the second APP does not include a congested link.

With reference to the first aspect or any one of the foregoing possible implementations of the first aspect, a seventh possible implementation of the first aspect is further provided. The root node is a physical node, the port path information is a packet transport port path (PTPP), and obtaining, by the controller, the port path information according to the first APP and the second APP includes removing, by the controller, a redundant portion of the first APP to obtain a third APP, where the redundant portion of the first APP is a portion of the first APP other than a port sequence, and the port sequence of the first APP includes the port that the logical link from the root node to the first server passes through, removing, by the controller, a redundant portion of the second APP to obtain a fourth APP, where the redundant portion of the second APP is a portion of the second APP other than a port sequence, and the port sequence of the second APP includes the port that the logical link from the root node to the second server passes through, reversing, by the controller, the third APP to obtain a reversed third APP, and splicing, by the controller, the reversed third APP and the fourth APP to obtain the PTPP.

With reference to the first aspect or any one of the foregoing possible implementations of the first aspect, an eighth possible implementation of the first aspect is further provided. The port path information is a PTPP, and obtaining, by the controller, the port path information according to the first APP and the second APP includes removing, by the controller, a redundant portion of the first APP to obtain a third APP, where the redundant portion of the first APP is a portion of the first APP other than a port sequence, and the port sequence of the first APP includes the port that the logical link from the root node to the first server passes through, removing, by the controller, a redundant portion of the second APP to obtain a fourth APP, where the redundant portion of the second APP is a portion of the second APP other than a port sequence, and the port sequence of the second APP includes the port that the logical link from the root node to the second server passes through, removing, by the controller, a same prefix in the third APP and the fourth APP to obtain a fifth APP and a sixth APP, where the same prefix is a same port sequence included in the third APP and the fourth APP, the fifth APP is a port sequence obtained after the same prefix is removed from the third APP, and the sixth APP is a port sequence obtained after the same prefix is removed from the fourth APP, reversing, by the controller, the fifth APP to obtain a reversed fifth APP, and splicing, by the controller, the reversed fifth APP and the sixth APP to obtain the PTPP.

With reference to the eighth possible implementation of the first aspect, a ninth possible implementation of the first aspect is further provided. Splicing, by the controller, the reversed fifth APP and the sixth APP to obtain the PTPP includes splicing, by the controller, the reversed fifth APP and the sixth APP to obtain a seventh APP, and removing, by the controller, a port in an odd-numbered location in a port sequence included in the seventh APP to obtain the PTPP.

With reference to the first aspect or any one of the foregoing possible implementations of the first aspect, a tenth possible implementation of the first aspect is further provided. The network topology information further includes information about a port connection between a third forwarding device and the first forwarding device and information about a port connection between the third forwarding device and the second forwarding device, and the third forwarding device communicates with both the first forwarding device and the second forwarding device.

With reference to the first aspect or the tenth possible implementation of the first aspect, an eleventh possible implementation of the first aspect is further provided. The method further includes receiving, by the controller, a first packet sent by the first forwarding device, where the first packet includes a first port number, the identifier of the first server, and an identifier of the first forwarding device, and a port identified by the first port number is a port of the first forwarding device for communicating with the first server, receiving, by the controller, a second packet sent by the second forwarding device, where the second packet includes a second port number, the identifier of the second server, and an identifier of the second forwarding device, and a port identified by the second port number is a port of the second forwarding device for communicating with the second server, obtaining, by the controller, the information about the port connection between the first server and the first forwarding device according to the first port number, the identifier of the first server, and the identifier of the first forwarding device that are included in the first packet, obtaining, by the controller, the information about the port connection between the second server and the second forwarding device according to the second port number, the identifier of the second server, and the identifier of the second forwarding device that are included in the second packet, and obtaining, by the controller, the network topology information according to the information about the port connection between the first server and the first forwarding device and the information about the port connection between the second server and the second forwarding device.

With reference to the first aspect or the tenth possible implementation of the first aspect, a twelfth possible implementation of the first aspect is further provided. The method further includes obtaining, by the controller, first Dynamic Host Configuration Protocol (DHCP) information allocated by the controller to the first server, where the first DHCP information includes a first port number, the identifier of the first server, and an identifier of the first forwarding device, and a port identified by the first port number is a port of the first forwarding device for communicating with the first server, obtaining, by the controller, second DHCP information allocated by the controller to the second server, where the second DHCP information includes a second port number, the identifier of the second server, and an identifier of the second forwarding device, and a port identified by the second port number is a port of the second forwarding device for communicating with the second server, obtaining, by the controller, the information about the port connection between the first server and the first forwarding device according to the first port number, the identifier of the first server, and the identifier of the first forwarding device that are included in the first DHCP information, obtaining, by the controller, the information about the port connection between the second server and the second forwarding device according to the second port number, the identifier of the second server, and the identifier of the second forwarding device that are included in the second DHCP information, and obtaining, by the controller, the network topology information according to the information about the port connection between the first server and the first forwarding device and the information about the port connection between the second server and the second forwarding device.

With reference to the tenth possible implementation of the first aspect, a thirteenth possible implementation of the first aspect is further provided. The method further includes receiving, by the controller, a first Link Layer Discovery Protocol (LLDP) message sent by the third forwarding device, where the first LLDP message includes a third port number, a fourth port number, an identifier of the third forwarding device, and an identifier of the first forwarding device, a port identified by the third port number is a port of the first forwarding device for communicating with the third forwarding device, and a port identified by the fourth port number is a port of the third forwarding device for communicating with the first forwarding device, receiving, by the controller, a second LLDP message sent by the third forwarding device, where the second LLDP message includes a fifth port number, a sixth port number, the identifier of the third forwarding device, and an identifier of the second forwarding device, a port identified by the fifth port number is a port of the third forwarding device for communicating with the second forwarding device, and a port identified by the sixth port number is a port of the second forwarding device for communicating with the third forwarding device, obtaining, by the controller, the information about the port connection between the third forwarding device and the first forwarding device according to the third port number, the fourth port number, the identifier of the third forwarding device, and the identifier of the first forwarding device that are included in the first LLDP message, and obtaining, by the controller, the information about the port connection between the third forwarding device and the second forwarding device according to the fifth port number, the sixth port number, the identifier of the third forwarding device, and the identifier of the second forwarding device that are included in the second LLDP message.

According to a second aspect, a method for obtaining a port path is provided, including sending, by a first server, a request message to a controller, where the request message includes an identifier of the first server and an identifier of a second server, the request message is used to request port path information from the controller, and the port path information includes a port that a logical link from the first server to the second server passes through, receiving, by the first server, the port path information sent by the controller, and obtaining, by the first server, a PTPP according to the port path information, where the PTPP is a port sequence that the link from the first server to the second server passes through.

In a first possible implementation of the second aspect, the method further includes adding, by the first server, the PTPP to a first packet to obtain a second packet, where the first packet is a packet sent by the first server to the second server, and sending, by the first server, the second packet to the second server.

With reference to the second aspect or the first possible implementation of the second aspect, a second possible implementation of the second aspect is further provided. The port path information includes a first APP and a second APP, the first APP includes a port that a logical link from a root node to the first server passes through, and the second APP includes a port that a logical link from the root node to the second server passes through, and the root node is a physical node, and obtaining, by the first server, a PTPP according to the port path information includes removing, by the first server, a redundant portion of the first APP to obtain a third APP, where the redundant portion of the first APP is a portion of the first APP other than a port sequence, and the port sequence of the first APP includes the port that the logical link from the root node to the first server passes through, removing, by the first server, a redundant portion of the second APP to obtain a fourth APP, where the redundant portion of the second APP is a portion of the second APP other than a port sequence, and the port sequence of the second APP includes the port that the logical link from the root node to the second server passes through, reversing, by the first server, the third APP to obtain a reversed third APP, and splicing, by the first server, the reversed third APP and the fourth APP to obtain the PTPP.

With reference to the second aspect or the first possible implementation of the second aspect, a third possible implementation of the second aspect is further provided. The port path information includes a first APP and a second APP, the first APP includes a port that a logical link from a root node to the first server passes through, and the second APP includes a port that a logical link from the root node to the second server passes through, and obtaining, by the first server, a PTPP according to the port path information includes removing, by the first server, a redundant portion of the first APP to obtain a third APP, where the redundant portion of the first APP is a portion of the first APP other than a port sequence, and the port sequence of the first APP includes the port that the logical link from the root node to the first server passes through, removing, by the first server, a redundant portion of the second APP to obtain a fourth APP, where the redundant portion of the second APP is a portion of the second APP other than a port sequence, and the port sequence of the second APP includes the port that the logical link from the root node to the second server passes through, removing, by the first server, a same prefix in the third APP and the fourth APP to obtain a fifth APP and a sixth APP, where the same prefix is a same port sequence included in the third APP and the fourth APP, the fifth APP is a port sequence obtained after the same prefix is removed from the third APP, and the sixth APP is a port sequence obtained after the same prefix is removed from the fourth APP, reversing, by the first server, the fifth APP to obtain a reversed fifth APP, and splicing, by the first server, the reversed fifth APP and the sixth APP to obtain the PTPP.

With reference to the third possible implementation of the second aspect, a fourth possible implementation of the second aspect is further provided. Splicing, by the first server, the reversed fifth APP and the sixth APP to obtain the PTPP includes splicing, by the first server, the reversed fifth APP and the sixth APP to obtain a seventh APP, and removing, by the first server, a port in an odd-numbered location in a port sequence included in the seventh APP to obtain the PTPP.

With reference to the first possible implementation of the second aspect, a fifth possible implementation of the second aspect is further provided. Adding, by the first server, the PTPP to a first packet to obtain a second packet includes obtaining, by the first server, a path hop count corresponding to the PTPP, where a packet header of the first packet includes a MAC field, and the path hop count is used to identify a location, in the PTPP, of a port that sends the second packet, and adding, by the first server, the PTPP, the path hop count, and a type identifier to the MAC field, where the type identifier is used to indicate that the second packet includes the PTPP.

With reference to the first possible implementation of the second aspect, a sixth possible implementation of the second aspect is further provided. The second packet includes a Multiprotocol Label Switching (MPLS) field, and adding, by the first server, the PTPP to a first packet to obtain a second packet includes adding, by the first server, the PTPP to the MPLS field to obtain the second packet.

According to a third aspect, a method for forwarding a packet according to a port path is provided, including receiving, by a forwarding device, a first packet sent by a network device, where the network device is a first server or a previous-hop device, the previous-hop device is a previous hop of the forwarding device on a link corresponding to a PTPP, the first packet includes the PTPP, and the PTPP is a port sequence that a link from the first server to a second server passes through, obtaining, by the forwarding device, a second packet according to the PTPP included in the first packet, where a PTPP included in the second packet is used to instruct a next hop of the forwarding device to forward a packet, and sending, by the forwarding device, the second packet to the second server using a port indicated by the PTPP included in the first packet.

In a first possible implementation of the third aspect, a packet header of the first packet includes a MAC field, where the MAC field includes the PTPP, a path hop count, and a type identifier, the path hop count is used to identify a location of a port in the PTPP, and the type identifier is used to indicate that the first packet includes the PTPP, and sending, by the forwarding device, the second packet to the second server using a port indicated by the PTPP included in the first packet includes obtaining, by the forwarding device, the type identifier from the MAC field, obtaining, by the forwarding device, the PTPP and the path hop count from the MAC field after determining, according to the type identifier, that the first packet includes the path hop count, selecting, by the forwarding device from the PTPP according to the path hop count included in the first packet, a port used to send the second packet, and sending, by the forwarding device, the second packet to the second server using the port used to send the second packet.

With reference to the third aspect, a second possible implementation of the third aspect is further provided. A packet header of the first packet includes an MPLS field, where the MPLS field includes the PTPP, and sending, by the forwarding device, the second packet to the second server using a port indicated by the PTPP included in the first packet includes obtaining, by the forwarding device, a topmost port number from the MPLS field, and sending, by the forwarding device, the second packet to the second server using a port identified by the topmost port number.

According to a fourth aspect, a controller is provided, including a first receiving module configured to receive a request message from a first server, where the request message includes an identifier of the first server and an identifier of a second server, the request message is used to request port path information from the controller, and the port path information includes a port that a logical link from the first server to the second server passes through, a first obtaining module configured to obtain a first APP and a second APP according to network topology information, the identifier of the first server, and the identifier of the second server, where the network topology information includes information about a port connection between the first server and a first forwarding device and information about a port connection between the second server and a second forwarding device, the first forwarding device communicates with the first server, the second forwarding device communicates with the second server, the first APP includes a port that a logical link from a root node to the first server passes through, and the second APP includes a port that a logical link from the root node to the second server passes through, a second obtaining module configured to obtain the port path information according to the first APP and the second APP, and a sending module configured to send the port path information to the first server.

In a first possible implementation of the fourth aspect, the first obtaining module is further configured to determine the root node according to the network topology information, where the root node is a node serving as a root of a tree, and leaf nodes of the tree include the first forwarding device and the second forwarding device, obtain information about the root node, where the information about the root node includes an identifier of the root node, a seventh port number, and an eighth port number, a port identified by the seventh port number is a port that is of the root node and that can communicate with the first server, and a port identified by the eighth port number is a port that is of the root node and that can communicate with the second server, obtain the first APP according to the network topology information, the identifier of the first server, and the information about the root node, and obtain the second APP according to the network topology information, the identifier of the second server, and the information about the root node.

With reference to the first possible implementation of the fourth aspect, a second possible implementation of the fourth aspect is further provided. The first obtaining module is further configured to obtain a first APP set according to the network topology information, the identifier of the first server, and the information about the root node, where the first APP set includes at least one first APP, and the at least one first APP corresponds to the first server, and select one first APP from the first APP set as the first APP.

With reference to the second possible implementation of the fourth aspect, a third possible implementation of the fourth aspect is further provided. The first obtaining module is further configured to select the first APP from the first APP set according to link status information of a logical link corresponding to the at least one first APP, where the link status information is used to identify whether congestion occurs on the logical link, and the first APP does not include a congested link.

With reference to the second possible implementation of the fourth aspect or the third possible implementation of the fourth aspect, a fourth possible implementation of the fourth aspect is further provided. The first obtaining module is further configured to obtain a second APP set according to the network topology information, the identifier of the second server, and the information about the root node, where the second APP set includes at least one second APP, and the at least one second APP corresponds to the second server, and select one second APP from the second APP set as the second APP.

With reference to the fourth possible implementation of the fourth aspect, a fifth possible implementation of the fourth aspect is further provided. The first obtaining module is further configured to select one second APP from the second APP set as the second APP according to the first APP, where the second APP and the first APP include a same port number, and the same port number is the seventh port number or the eighth port number.

With reference to the fourth possible implementation of the fourth aspect, a sixth possible implementation of the fourth aspect is further provided. The first obtaining module is further configured to select N second APPs from the second APP set according to the first APP, where N is an integer greater than or equal to 1, any second APP of the N second APPs and the first APP include a same port number, and the same port number is the seventh port number or the eighth port number, and select the second APP from the N second APPs according to link status information of a logical link corresponding to the N second APPs, where the link status information is used to identify whether congestion occurs on the logical link, and the second APP does not include a congested link.

With reference to the fourth aspect or any one of the foregoing possible implementations of the fourth aspect, a seventh possible implementation of the fourth aspect is further provided. The root node is a physical node, the port path information is a PTPP, and the second obtaining module is further configured to remove a redundant portion of the first APP to obtain a third APP, where the redundant portion of the first APP is a portion of the first APP other than a port sequence, and the port sequence of the first APP includes the port that the logical link from the root node to the first server passes through, remove a redundant portion of the second APP to obtain a fourth APP, where the redundant portion of the second APP is a portion of the second APP other than a port sequence, and the port sequence of the second APP includes the port that the logical link from the root node to the second server passes through, reverse the third APP to obtain a reversed third APP, and splice the reversed third APP and the fourth APP to obtain the PTPP.

With reference to the fourth aspect or any one of the foregoing possible implementations of the fourth aspect, an eighth possible implementation of the fourth aspect is further provided. The port path information is a PTPP, and the second obtaining module is further configured to remove a redundant portion of the first APP to obtain a third APP, where the redundant portion of the first APP is a portion of the first APP other than a port sequence, and the port sequence of the first APP includes the port that the logical link from the root node to the first server passes through, remove a redundant portion of the second APP to obtain a fourth APP, where the redundant portion of the second APP is a portion of the second APP other than a port sequence, and the port sequence of the second APP includes the port that the logical link from the root node to the second server passes through, remove a same prefix in the third APP and the fourth APP to obtain a fifth APP and a sixth APP, where the same prefix is a same port sequence included in the third APP and the fourth APP, the fifth APP is a port sequence obtained after the same prefix is removed from the third APP, and the sixth APP is a port sequence obtained after the same prefix is removed from the fourth APP, reverse the fifth APP to obtain a reversed fifth APP, and splice the reversed fifth APP and the sixth APP to obtain the PTPP.

With reference to the eighth possible implementation of the fourth aspect, a ninth possible implementation of the fourth aspect is further provided. The second obtaining module is further configured to splice the reversed fifth APP and the sixth APP to obtain a seventh APP, and remove a port in an odd-numbered location in a port sequence included in the seventh APP to obtain the PTPP.

With reference to the fourth aspect or any one of the foregoing possible implementations of the fourth aspect, a tenth possible implementation of the fourth aspect is further provided. The network topology information further includes information about a port connection between a third forwarding device and the first forwarding device and information about a port connection between the third forwarding device and the second forwarding device, and the third forwarding device communicates with both the first forwarding device and the second forwarding device.

With reference to the fourth aspect or the tenth possible implementation of the fourth aspect, an eleventh possible implementation of the fourth aspect is further provided. The controller further includes a second receiving module configured to receive a first packet sent by the first forwarding device, where the first packet includes a first port number, the identifier of the first server, and an identifier of the first forwarding device, and a port identified by the first port number is a port of the first forwarding device for communicating with the first server, a third receiving module configured to receive a second packet sent by the second forwarding device, where the second packet includes a second port number, the identifier of the second server, and an identifier of the second forwarding device, and a port identified by the second port number is a port of the second forwarding device for communicating with the second server, a third obtaining module configured to obtain the information about the port connection between the first server and the first forwarding device according to the first port number, the identifier of the first server, and the identifier of the first forwarding device that are included in the first packet, a fourth obtaining module configured to obtain the information about the port connection between the second server and the second forwarding device according to the second port number, the identifier of the second server, and the identifier of the second forwarding device that are included in the second packet, and a fifth obtaining module configured to obtain the network topology information according to the information about the port connection between the first server and the first forwarding device and the information about the port connection between the second server and the second forwarding device.

With reference to the fourth aspect or the tenth possible implementation of the fourth aspect, a twelfth possible implementation of the fourth aspect is further provided. The controller further includes a sixth obtaining module configured to obtain first DHCP information allocated by the controller to the first server, where the first DHCP information includes a first port number, the identifier of the first server, and an identifier of the first forwarding device, and a port identified by the first port number is a port of the first forwarding device for communicating with the first server, a seventh obtaining module configured to obtain second DHCP information allocated by the controller to the second server, where the second DHCP information includes a second port number, the identifier of the second server, and an identifier of the second forwarding device, and a port identified by the second port number is a port of the second forwarding device for communicating with the second server, a third obtaining module configured to obtain the information about the port connection between the first server and the first forwarding device according to the first port number, the identifier of the first server, and the identifier of the first forwarding device that are included in the first DHCP information, a fourth obtaining module configured to obtain the information about the port connection between the second server and the second forwarding device according to the second port number, the identifier of the second server, and the identifier of the second forwarding device that are included in the second DHCP information, and a fifth obtaining module configured to obtain the network topology information according to the information about the port connection between the first server and the first forwarding device and the information about the port connection between the second server and the second forwarding device.

With reference to the tenth possible implementation of the fourth aspect, a thirteenth possible implementation of the fourth aspect is further provided. The controller further includes a fourth receiving module configured to receive a first LLDP message sent by the third forwarding device, where the first LLDP message includes a third port number, a fourth port number, an identifier of the third forwarding device, and an identifier of the first forwarding device, a port identified by the third port number is a port of the first forwarding device for communicating with the third forwarding device, and a port identified by the fourth port number is a port of the third forwarding device for communicating with the first forwarding device, a fifth receiving module configured to receive a second LLDP message sent by the third forwarding device, where the second LLDP message includes a fifth port number, a sixth port number, the identifier of the third forwarding device, and an identifier of the second forwarding device, a port identified by the fifth port number is a port of the third forwarding device for communicating with the second forwarding device, and a port identified by the sixth port number is a port of the second forwarding device for communicating with the third forwarding device, an eighth obtaining module configured to obtain the information about the port connection between the third forwarding device and the first forwarding device according to the third port number, the fourth port number, the identifier of the third forwarding device, and the identifier of the first forwarding device that are included in the first LLDP message, and a ninth obtaining module configured to obtain the information about the port connection between the third forwarding device and the second forwarding device according to the fifth port number, the sixth port number, the identifier of the third forwarding device, and the identifier of the second forwarding device that are included in the second LLDP message.

According to a fifth aspect, a first server is provided, including a first sending module configured to send a request message to a controller, where the request message includes an identifier of the first server and an identifier of a second server, the request message is used to request port path information from the controller, and the port path information includes a port that a logical link from the first server to the second server passes through, a receiving module configured to receive the port path information sent by the controller, and a first obtaining module configured to obtain a PTPP according to the port path information, where the PTPP is a port sequence that the link from the first server to the second server passes through.

In a first possible implementation of the fifth aspect, the first server further includes a second obtaining module configured to add the PTPP to a first packet to obtain a second packet, where the first packet is a packet sent by the first server to the second server, and a second sending module configured to send the second packet to the second server.

With reference to the fifth aspect or the first possible implementation of the fifth aspect, a second possible implementation of the fifth aspect is further provided. The port path information includes a first APP and a second APP, the first APP includes a port that a logical link from a root node to the first server passes through, and the second APP includes a port that a logical link from the root node to the second server passes through, and the root node is a physical node, and the first obtaining module is further configured to remove a redundant portion of the first APP to obtain a third APP, where the redundant portion of the first APP is a portion of the first APP other than a port sequence, and the port sequence of the first APP includes the port that the logical link from the root node to the first server passes through, remove a redundant portion of the second APP to obtain a fourth APP, where the redundant portion of the second APP is a portion of the second APP other than a port sequence, and the port sequence of the second APP includes the port that the logical link from the root node to the second server passes through, reverse the third APP to obtain a reversed third APP, and splice the reversed third APP and the fourth APP to obtain the PTPP.

With reference to the fifth aspect or the first possible implementation of the fifth aspect, a third possible implementation of the fifth aspect is further provided. The port path information includes a first APP and a second APP, the first APP includes a port that a logical link from a root node to the first server passes through, and the second APP includes a port that a logical link from the root node to the second server passes through, and the first obtaining module is further configured to remove a redundant portion of the first APP to obtain a third APP, where the redundant portion of the first APP is a portion of the first APP other than a port sequence, and the port sequence of the first APP includes the port that the logical link from the root node to the first server passes through, remove a redundant portion of the second APP to obtain a fourth APP, where the redundant portion of the second APP is a portion of the second APP other than a port sequence, and the port sequence of the second APP includes the port that the logical link from the root node to the second server passes through, remove a same prefix in the third APP and the fourth APP to obtain a fifth APP and a sixth APP, where the same prefix is a same port sequence included in the third APP and the fourth APP, the fifth APP is a port sequence obtained after the same prefix is removed from the third APP, and the sixth APP is a port sequence obtained after the same prefix is removed from the fourth APP, reverse the fifth APP to obtain a reversed fifth APP, and splice the reversed fifth APP and the sixth APP to obtain the PTPP.

With reference to the third possible implementation of the fifth aspect, a fourth possible implementation of the fifth aspect is further provided. The first obtaining module is further configured to splice the reversed fifth APP and the sixth APP to obtain a seventh APP, and remove a port in an odd-numbered location in a port sequence included in the seventh APP to obtain the PTPP.

With reference to the first possible implementation of the fifth aspect, a fifth possible implementation of the fifth aspect is further provided. The second obtaining module is further configured to obtain a path hop count corresponding to the PTPP, where a packet header of the first packet includes a MAC field, and the path hop count is used to identify a location, in the PTPP, of a port that sends the second packet, and add the PTPP, the path hop count, and a type identifier to the MAC field, where the type identifier is used to indicate that the second packet includes the PTPP.

With reference to the first possible implementation of the fifth aspect, a sixth possible implementation of the fifth aspect is further provided. The second packet includes an MPLS field, and the second obtaining module is further configured to add the PTPP to the MPLS field to obtain the second packet.

According to a sixth aspect, a forwarding device is provided, including a receiving module configured to receive a first packet sent by a network device, where the network device is a first server or a previous-hop device, the previous-hop device is a previous hop of the forwarding device on a link corresponding to a PTPP, the first packet includes the PTPP, and the PTPP is a port sequence that a link from the first server to a second server passes through, an obtaining module configured to obtain a second packet according to the PTPP included in the first packet, where a PTPP included in the second packet is used to instruct a next hop of the forwarding device to forward a packet, and a forwarding module configured to send the second packet to the second server using a port indicated by the PTPP included in the first packet.

In a first possible implementation of the sixth aspect, a packet header of the first packet includes a MAC field, where the MAC field includes the PTPP, a path hop count, and a type identifier, the path hop count is used to identify a location of a port in the PTPP, and the type identifier is used to indicate that the first packet includes the PTPP, and the forwarding module is further configured to obtain the type identifier from the MAC field, obtain the PTPP and the path hop count from the MAC field after determining, according to the type identifier, that the first packet includes the path hop count, select, from the PTPP according to the path hop count included in the first packet, a port used to send the second packet, and send the second packet to the second server using the port used to send the second packet.

With reference to the sixth aspect, a second possible implementation of the sixth aspect is further provided. A packet header of the first packet includes an MPLS field, where the MPLS field includes the PTPP, the path hop count, and the type identifier, and the forwarding module is further configured to obtain a topmost port number from the MPLS field, and send the second packet to the second server using a port identified by the topmost port number.

According to a seventh aspect, a system for obtaining a port path is provided, including the controller according to the fourth aspect or any one of the foregoing possible implementations of the fourth aspect and the first server according to the fifth aspect or any one of the foregoing possible implementations of the fifth aspect.

In a first possible implementation of the seventh aspect, the system further includes the forwarding device according to the sixth aspect or any one of the foregoing possible implementations of the sixth aspect.

According to the method for obtaining a port path and the apparatus in the embodiments of the present disclosure, a controller or a first server may obtain, according to a first APP and a second APP, a PTPP that is used to instruct forwarding of a first packet, where the first packet is a packet sent by the first server to a second server, the PTPP is a port sequence that a link from the first server to the second server passes through. The first server may add the PTPP and a path hop count to the first packet to obtain a second packet that includes the PTPP and the path hop count. The first server sends the second packet to the second server, and a forwarding device on the link from the first server to the second server may determine, according to the PTPP and the path hop count in the received packet, a port used to send the packet, and sends the packet to the second server using the port. In this way, a forwarding device in a network may implement packet sending according to a PTPP carried in a received packet, that is, port path information may be used to instruct packet forwarding, without a need of storing a MAC entry or a router entry such that the forwarding device in the network processes the packet without relying on the MAC entry or the router entry. This helps improve a network capacity.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. The described embodiments are some but not all of the embodiments of the present disclosure. All other embodiments obtained by a person of ordinary skill in the art based on the embodiments of the present disclosure without creative efforts shall fall within the protection scope of the present disclosure.

The embodiments of the present disclosure can be applied to a network. The network includes a controller, a forwarding device, and a server. The network may be further a data center network, a backbone network, an Internet data center (IDC) room, or the like.

In the following embodiment, a data center network is used as an example for description.

Figure 2:
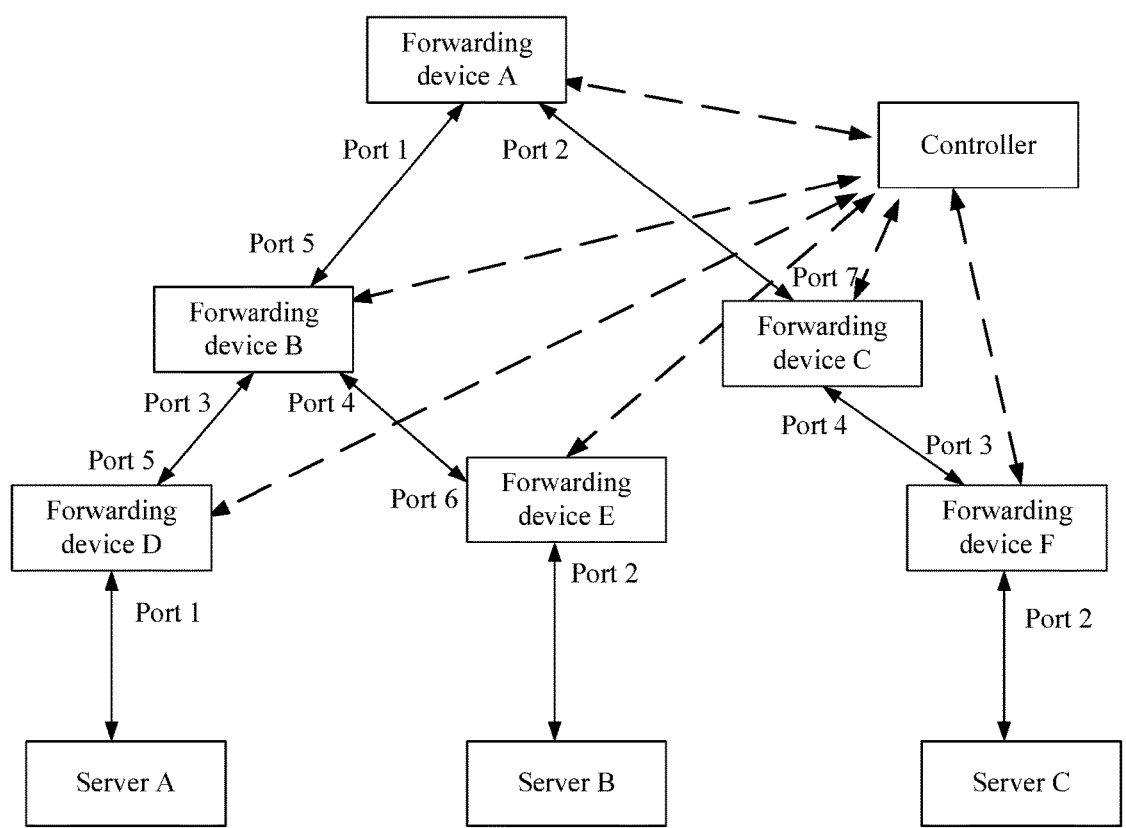
FIG. 2 is a system architecture diagram of a data center network according to an embodiment of the present disclosure.
Figure 3:
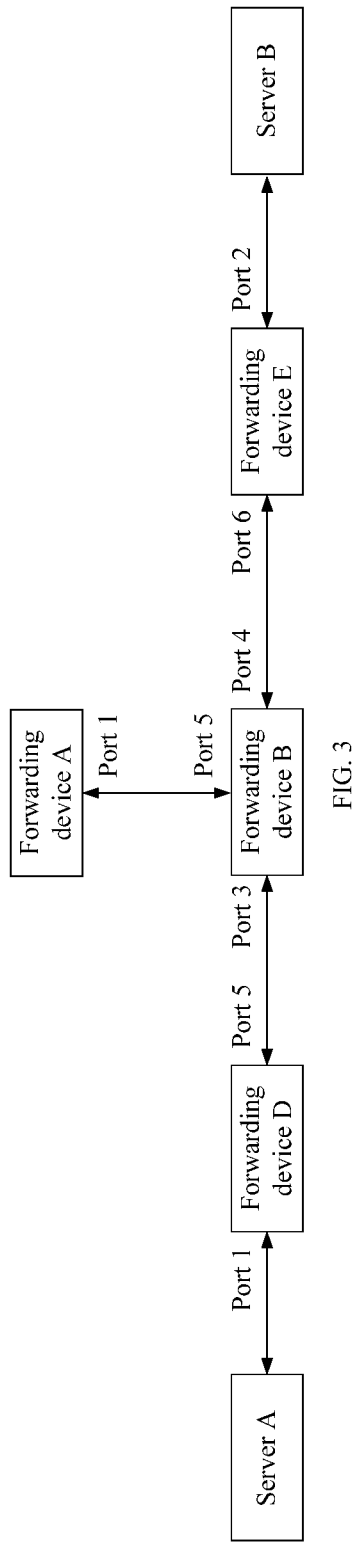
FIG. 3 is a schematic diagram of a network topology of a data center network according to an embodiment of the present disclosure.
Figure 4:
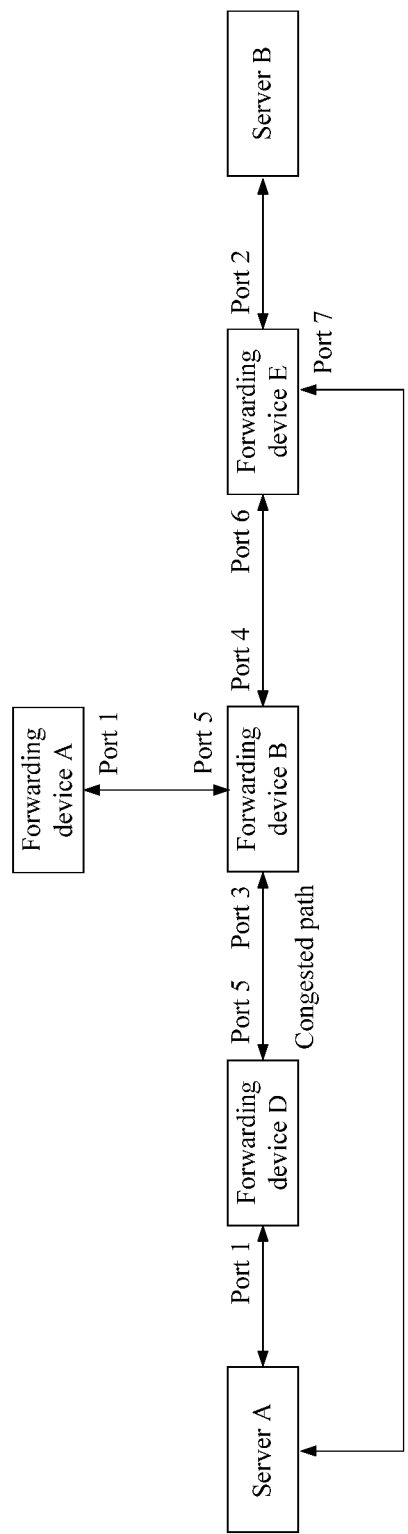
FIG. 4 is a schematic diagram of another network topology of a data center network according to an embodiment of the present disclosure.
Figure 5:
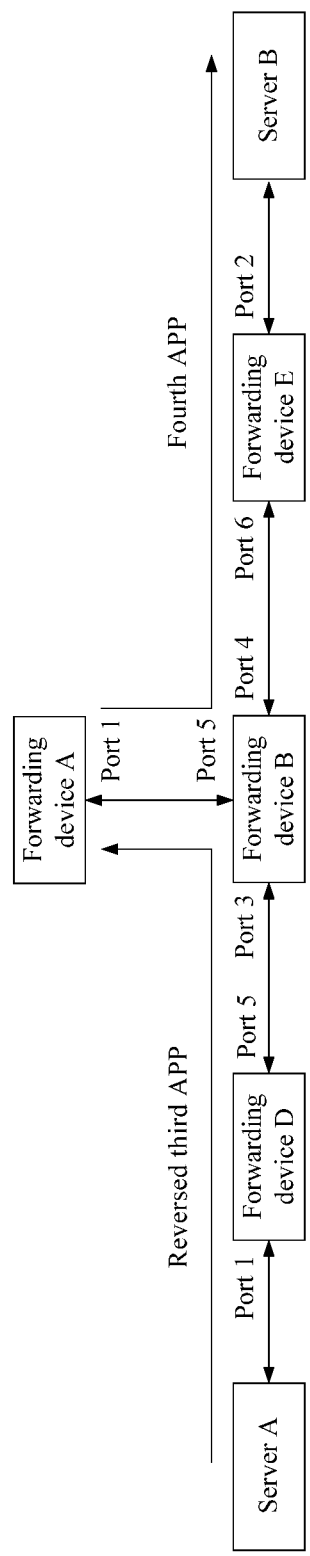
FIG. 5 is a schematic diagram of computing a PTPP in a data center network according to an embodiment of the present disclosure.
Figure 6:
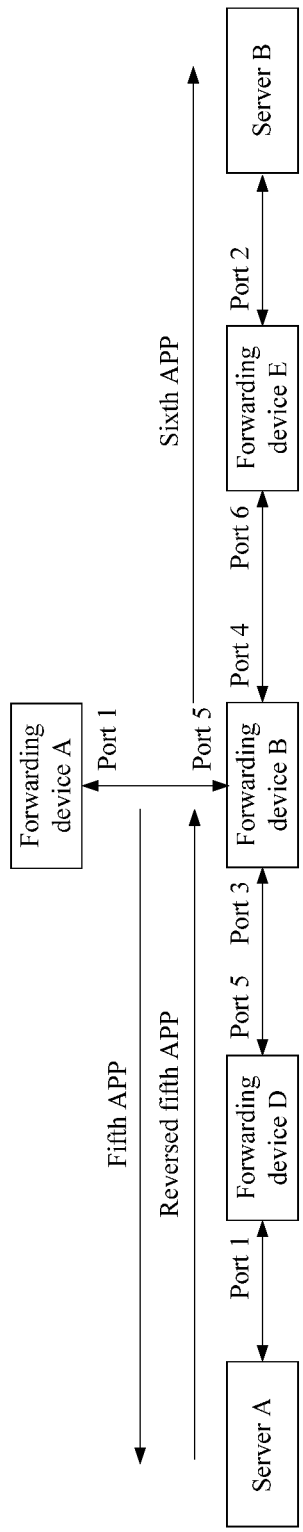
FIG. 6 is another schematic diagram of computing a PTPP in a data center network according to an embodiment of the present disclosure.

FIG. 2 is a system architecture diagram of a data center network according to an embodiment of the present disclosure. As shown in FIG. 2, a method in this embodiment can be applied to the data center network. The data center network includes a controller, a server A, a server B, a server C, a forwarding device A, a forwarding device B, a forwarding device C, a forwarding device D, a forwarding device E, and a forwarding device F. The controller can communicate with any forwarding device in the data center network. FIG. 3 is a schematic diagram of a network topology of a data center network according to an embodiment of the present disclosure. A link shown in FIG. 3 is a link from the server A to the server B in the network shown in FIG. 2. That is, the link shown in FIG. 3 is: the server A→the forwarding device D→the forwarding device B→the forwarding device E→the server B. The forwarding device A in FIG. 3 is a root node selected by the controller, and the root node is a physical node. That is, the forwarding device A serving as the root node has a physical entity. FIG. 4 is a schematic diagram of another network topology of a data center network according to an embodiment of the present disclosure. A difference between a link shown in FIG. 4 and the link shown in FIG. 3 lies in that there is a direct link between the forwarding device E in FIG. 4 and the server A in FIG. 4. Congestion occurs between the forwarding device D in FIG. 4 and the forwarding device B in FIG. 4. FIG. 5 is a schematic diagram of computing a PTPP in a data center network according to an embodiment of the present disclosure. FIG. 6 is another schematic diagram of computing a PTPP in a data center network according to an embodiment of the present disclosure. Scenarios corresponding to FIG. 5 and FIG. 6 are the same as a scenario corresponding to FIG. 3. That is, the scenarios of FIG. 5 and FIG. 6 are scenarios in which a link status is not considered.

Figure 1:
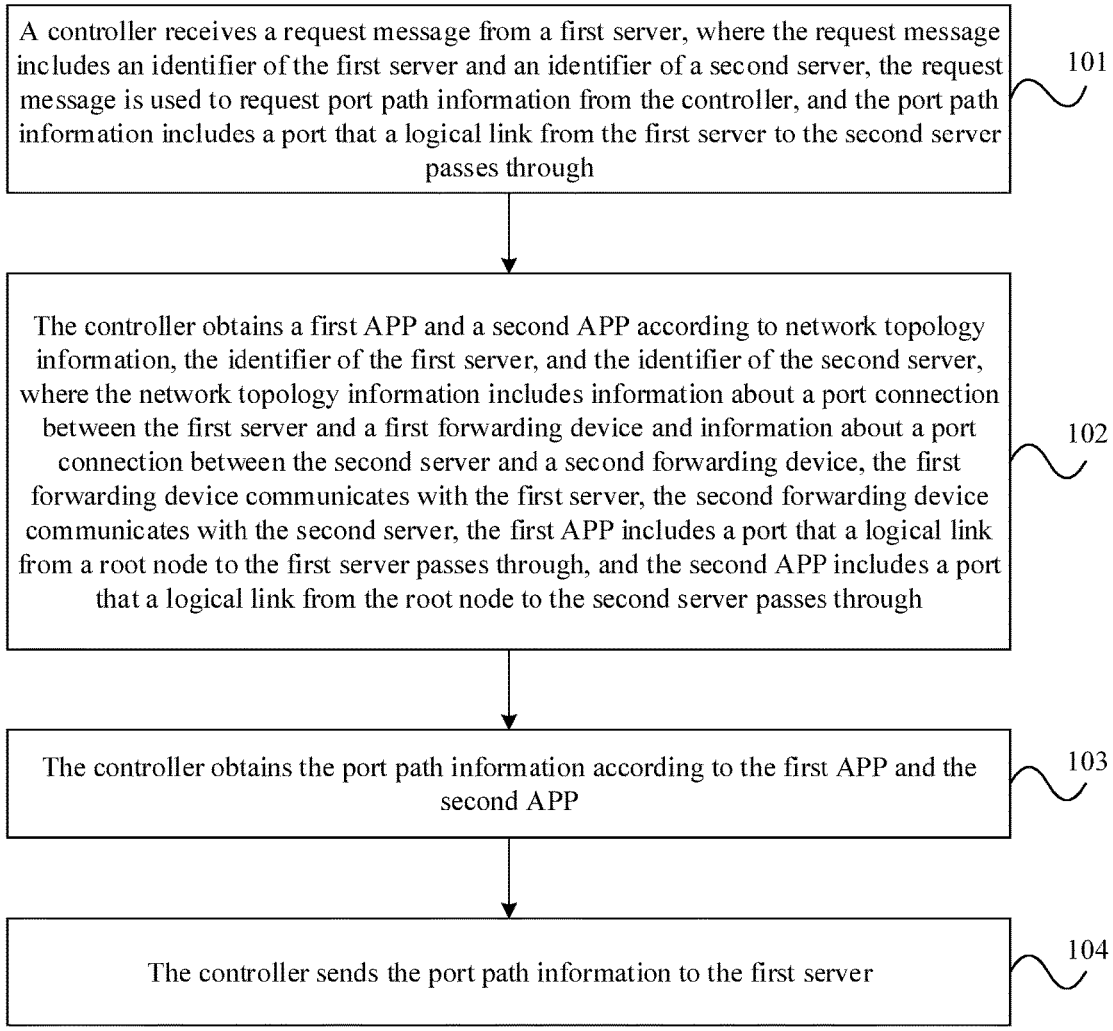
FIG. 1 is a flowchart of a method for obtaining a port path according to an embodiment of the present disclosure.

FIG. 1 is a flowchart of a method for obtaining a port path according to an embodiment of the present disclosure. FIG. 1 illustrates the method for obtaining a port path according to this embodiment of the present disclosure from the perspective of a controller side. With reference to FIG. 2, FIG. 3, FIG. 4, FIG. 5, and FIG. 6, the following describes the method for obtaining a port path according to this embodiment of the present disclosure shown in FIG. 1.

Step 101: The controller receives a request message from a first server, where the request message includes an identifier of the first server and an identifier of a second server, the request message is used to request port path information from the controller, and the port path information includes a port that a logical link from the first server to the second server passes through.

For example, the identifier of the first server may be a MAC address of the first server, an identifier allocated to the first server, an Internet Protocol (IP) address of the first server, or other information. The identifier of the second server may be a MAC address of the second server, an identifier allocated to the second server, an IP address of the second server, or other information.

For example, the server A in FIG. 2 or FIG. 3 may be the first server, and the server B may be the second server. The server A may send a request message to the controller. The request message may include the server A and the server B. Port path information requested by the server A includes ports on a link in FIG. 3 the forwarding device D→the forwarding device B→the forwarding device E.

Step 102: The controller obtains a first APP and a second APP according to network topology information, the identifier of the first server, and the identifier of the second server, where the network topology information includes information about a port connection between the first server and a first forwarding device and information about a port connection between the second server and a second forwarding device, the first forwarding device communicates with the first server, the second forwarding device communicates with the second server, the first APP includes a port that a logical link from a root node to the first server passes through, and the second APP includes a port that a logical link from the root node to the second server passes through.

For example, the controller may pre-configure or pre-generate the network topology information. For example, the controller may be a software-defined networking (SDN) controller. The SDN controller may obtain information about a port connection between two adjacent forwarding devices in a network using a topology discovery mechanism in the OpenFlow protocol or another protocol. The network topology information may be used to indicate a connection relationship between forwarding devices in the network and a connection relationship between a forwarding device and a server in the network. If a link between the first forwarding device and the second forwarding device further includes another forwarding device such as a third forwarding device, the network topology information further includes information about a port connection between the third forwarding device and the first forwarding device and information about a port connection between the third forwarding device and the second forwarding device, and the third forwarding device communicates with both the first forwarding device and the second forwarding device.

For example, a manner in which the controller selects the root node may include A forwarding device in the network reports a role, forwarding devices in the network report a role after mutual negotiation, information about the root node is configured on the controller, or the controller selects the root node according to the network topology information. The root node is a physically existing forwarding device or a virtual forwarding device, and there may be a logical link between the root node and any forwarding device or server. The virtual forwarding device may be a device that does not exist physically or that is obtained by means of virtualization of multiple physically existing forwarding devices. The root node in this embodiment is a physically existing forwarding device, such as the forwarding device A.

For example, that the controller obtains a first APP and a second APP according to network topology information, the identifier of the first server, and the identifier of the second server includes that the controller determines the root node according to the network topology information, where the root node is a node serving as a root of a tree, and leaf nodes of the tree include the first forwarding device and the second forwarding device, the controller obtains information about the root node, where the information about the root node includes an identifier of the root node, a seventh port number, an eighth port number, a port identified by the seventh port number is a port that is of the root node and that can communicate with the first server, and a port identified by the eighth port number is a port that is of the root node and that can communicate with the second server, and the controller obtains the first APP according to the network topology information, the identifier of the first server, and the information about the root node, and the controller obtains the second APP according to the network topology information, the identifier of the second server, and the information about the root node.

For example, that the controller obtains the first APP according to the network topology information, the identifier of the first server, and the information about the root node includes The controller obtains a first APP set according to the network topology information, the identifier of the first server, and the information about the root node, where the first APP set includes at least one first APP, and the at least one first APP corresponds to the first server, and the controller selects one first APP from the first APP set as the first APP. The controller traverses the link from the root node to the first server, where a traversal manner includes but is not limited to breadth first, depth first, or a shortest path algorithm, and calculates all possible APPs to obtain the first APP set.

For example, that the controller obtains the second APP according to the network topology information, the identifier of the second server, and the information about the root node includes that the controller obtains a second APP set according to the network topology information, the identifier of the second server, and the information about the root node, where the second APP set includes at least one second APP, and the at least one second APP corresponds to the second server, and the controller selects one second APP from the second APP set as the second APP. The controller traverses the link from the root node to the second server, where a traversal manner includes but is not limited to breadth first, depth first, or a shortest path algorithm, and calculates all possible APPs to obtain the second APP set.

For example, when the controller selects the second APP from the second APP set, a port that is of the root node and that is included in the second APP may be different from a port that is of the root node and that is included in the first APP. Alternatively, the controller selects one second APP from the second APP set as the second APP according to the first APP. The second APP and the first APP include a same port number, and the same port number is the seventh port number or the eighth port number.

As shown in FIG. 2 and FIG. 3, the forwarding device A, the forwarding device B, the forwarding device C, the forwarding device D, the forwarding device E, and the forwarding device F form a tree-shaped structure. The controller selects the forwarding device A as a root node, and selects the forwarding device B, the forwarding device C, the forwarding device D, the forwarding device E, and the forwarding device F as leaf nodes. The seventh port number is a port 1 of the forwarding device A in FIG. 2 or FIG. 3, and the eighth port number is a port 1 of the forwarding device D in FIG. 2 or FIG. 3. A link corresponding to the first APP selected by the controller includes the port 1 of the forwarding device A→a port 5 of the forwarding device B→a port 3 of the forwarding device B→a port 5 of the forwarding device D→the port 1 of the forwarding device D, which may be simplified as [1,5,3,5,1]. The port 1 of the forwarding device D may communicate with the server A. The first APP selected by the controller may be represented as [0,0,0,0,0,0,0,1,5,3,5,1]. A link corresponding to the second APP selected by the controller includes the port 1 of the forwarding device A→the port 5 of the forwarding device B→a port 4 of the forwarding device B→a port 6 of the forwarding device E→a port 2 of the forwarding device E, which may be simplified as [1,5,4,6,2]. The port 2 of the forwarding device E may communicate with the server B. The second APP selected by the controller may be represented as [0,0,0,0,0,0,0,1,5,4,6,2]. The first APP and the second APP are two preferred APPs.

Optionally, that the controller selects one first APP from the first APP set as the first APP includes that the controller selects the first APP from the first APP set according to link status information of a logical link corresponding to the at least one first APP, where the link status information is used to identify whether congestion occurs on the logical link, and the first APP does not include a congested link. The controller may select the first APP according to a link status to avoid a congested link or a link to be congested.

As shown in FIG. 4, the controller may learn that a link between the forwarding device D and the forwarding device B is congested or is to be congested, and a link corresponding to the first APP selected by the controller is the port 1 of the forwarding device A→the port 5 of the forwarding device B→the port 4 of the forwarding device B→the port 6 of the forwarding device E→a port 7 of the forwarding device E, which may be simplified as [1,5,4,6,7]. The port 7 of the forwarding device E may communicate with the server A. The first APP selected by the controller may be represented as [0,0,0,0,0,0,0,1,5,4,6,7].

Optionally, that the controller selects one second APP from the second APP set as the second APP includes that the controller selects N second APPs from the second APP set according to the first APP, where N is an integer greater than or equal to 1, any second APP of the N second APPs and the first APP include a same port number, and the same port number is the seventh port number or the eighth port number, and the controller selects the second APP from the N second APPs according to link status information of a logical link corresponding to the N second APPs, where the link status information is used to identify whether congestion occurs on the logical link, and the second APP does not include a congested link.

As shown in FIG. 4, there is no congested link or no link to be congested on a link from the forwarding device A to the server B. A link corresponding to the second APP selected by the controller includes the port 1 of the forwarding device A→the port 5 of the forwarding device B→the port 4 of the forwarding device B→the port 6 of the forwarding device E→the port 2 of the forwarding device E, which may be simplified as [1,5,4,6,2]. The port 2 of the forwarding device E may communicate with the server B. The second APP selected by the controller may be represented as [0,0,0,0,0,0,0,1,5,4,6,2]. If there is a congested link or a link to be congested on the link from the forwarding device A to the server B, the controller may also select the second APP in a manner of selecting the first APP in FIG. 4, and details are not described herein again.

Step 103: The controller obtains the port path information according to the first APP and the second APP.

For example, the port path information is a PTPP, and that the controller obtains the port path information according to the first APP and the second APP includes that the controller removes a redundant portion of the first APP to obtain a third APP, where the redundant portion of the first APP is a portion of the first APP other than a port sequence, and the port sequence of the first APP includes the port that the logical link from the root node to the first server passes through, the controller removes a redundant portion of the second APP to obtain a fourth APP, where the redundant portion of the second APP is a portion of the second APP other than a port sequence, and the port sequence of the second APP includes the port that the logical link from the root node to the second server passes through, the controller reverses the third APP to obtain a reversed third APP, and the controller splices the reversed third APP and the fourth APP to obtain the PTPP.

As shown in FIG. 3 and FIG. 5, the first APP may be represented as [0,0,0,0,0,0,0,1,5,3,5,1], the third APP obtained by the controller according to the first APP may be represented as [1,5,3,5,1], and the reversed third APP obtained by the controller is the same as the third APP, and both may be represented as [1,5,3,5,1]. The second APP may be represented as [0,0,0,0,0,0,0,1,5,4,6,2], and the fourth APP obtained by the controller according to the second APP may be represented as [1,5,4,6,2]. The PTPP obtained by the controller may be represented as [1,5,3,5,1,1,5,4,6,2]. That is, a link corresponding to the PTPP may be represented as the port 1 of the forwarding device D→the port 5 of the forwarding device D→the port 3 of the forwarding device B→the port 5 of the forwarding device B→the port 1 of the forwarding device A→the port 5 of the forwarding device B→the port 4 of the forwarding device B→the port 6 of the forwarding device E→the port 2 of the forwarding device E.

Optionally, the port path information is a PTPP, and that the controller obtains the port path information according to the first APP and the second APP includes that the controller removes a redundant portion of the first APP to obtain a third APP, where the redundant portion of the first APP is a portion of the first APP other than a port sequence, and the port sequence of the first APP includes the port that the logical link from the root node to the first server passes through, the controller removes a redundant portion of the second APP to obtain a fourth APP, where the redundant portion of the second APP is a portion of the second APP other than a port sequence, and the port sequence of the second APP includes the port that the logical link from the root node to the second server passes through, the controller removes a same prefix in the third APP and the fourth APP to obtain a fifth APP and a sixth APP, where the same prefix is a same port sequence included in the third APP and the fourth APP, the fifth APP is a port sequence obtained after the same prefix is removed from the third APP, and the sixth APP is a port sequence obtained after the same prefix is removed from the fourth APP, the controller reverses the fifth APP to obtain a reversed fifth APP, and the controller splices the reversed fifth APP and the sixth APP to obtain the PTPP. Using this manner to obtain the PTPP can shorten a port sequence included in the PTPP, saving network resources.

As shown in FIG. 3 and FIG. 6, the first APP may be represented as [0,0,0,0,0,0,0,1,5,3,5,1], and the third APP obtained by the controller according to the first APP may be represented as [1,5,3,5,1]. The second APP may be represented as [0,0,0,0,0,0,0,1,5,4,6,2], and the fourth APP obtained by the controller according to the second APP may be represented as [1,5,4,6,2]. The third APP and the fourth APP include the same prefix, that is, [1,5]. The fifth APP obtained by the controller by removing the same prefix from the third APP may be represented as [3,5,1]. The sixth APP obtained by the controller by removing the same prefix from the fourth APP may be represented as [4,6,2]. The reversed fifth APP may be represented as [1,5,3]. The PTPP obtained by the controller may be represented as [1,5,3,4,6,2]. That is, a link corresponding to the PTPP may be represented as the port 1 of the forwarding device D→the port 5 of the forwarding device D→the port 3 of the forwarding device B→the port 4 of the forwarding device B→the port 6 of the forwarding device E→the port 2 of the forwarding device E. Using this manner to obtain the PTPP can effectively shorten the port sequence included in the PTPP.

Optionally, that the controller splices the reversed fifth APP and the sixth APP to obtain the PTPP includes that the controller splices the reversed fifth APP and the sixth APP to obtain a seventh APP, and the controller removes a port in an odd-numbered location in a port sequence included in the seventh APP to obtain the PTPP.

As shown in FIG. 3, the seventh APP may be represented as [1,5,3,4,6,2]. That is, a link corresponding to the seventh APP may be represented as the port 1 of the forwarding device D→the port 5 of the forwarding device D→the port 3 of the forwarding device B→the port 4 of the forwarding device B→the port 6 of the forwarding device E→the port 2 of the forwarding device E. The controller obtains the PTPP represented as [5,4,2] by removing port numbers in odd-numbered locations in [1,5,3,4,6,2]. In [5,4,2], 5, 4, and 2 respectively represent output ports of the forwarding device D, the forwarding device B, and the forwarding device E. This further simplifies the port sequence.

Step 104: The controller sends the port path information to the first server.

For example, the controller may send the port path information to the first server according to the identifier of the first server.

In this embodiment provided in the present disclosure, a controller receives a request message from a first server, where the request message is used to request port path information from the controller, and the port path information includes a port that a logical link from the first server to a second server passes through, the controller obtains the port path information according to a generated first APP and second APP, and the controller sends the port path information to the first server. This helps a forwarding device to forward a packet according to a PTPP that corresponds to the port path information and that is carried in the packet without a need to store a MAC entry or routing entry, thereby helping eliminate limitations on a network size by a MAC entry or routing entry on the forwarding device, and helping reduce costs.

Optionally, before step 101, the method provided in this embodiment of the present disclosure further includes obtaining, by the controller, the network topology information. The network topology information may include the information about the port connection between the first server and the first forwarding device and the information about the port connection between the second server and the second forwarding device.

For example, obtaining, by the controller, the network topology information includes receiving, by the controller, a first packet sent by the first forwarding device, where the first packet includes a first port number, the identifier of the first server, and an identifier of the first forwarding device, and a port identified by the first port number is a port of the first forwarding device for communicating with the first server, receiving, by the controller, a second packet sent by the second forwarding device, where the second packet includes a second port number, the identifier of the second server, and an identifier of the second forwarding device, and a port identified by the second port number is a port of the second forwarding device for communicating with the second server, obtaining, by the controller, the information about the port connection between the first server and the first forwarding device according to the first port number, the identifier of the first server, and the identifier of the first forwarding device that are included in the first packet, obtaining, by the controller, the information about the port connection between the second server and the second forwarding device according to the second port number, the identifier of the second server, and the identifier of the second forwarding device that are included in the second packet, and obtaining, by the controller, the network topology information according to the information about the port connection between the first server and the first forwarding device and the information about the port connection between the second server and the second forwarding device.

Optionally, if the controller may allocate DHCP information to the first server and the second server, obtaining, by the controller, the network topology information includes obtaining, by the controller, first DHCP information allocated by the controller to the first server, where the first DHCP information includes a first port number, the identifier of the first server, and an identifier of the first forwarding device, and a port identified by the first port number is a port of the first forwarding device for communicating with the first server, obtaining, by the controller, second DHCP information allocated by the controller to the second server, where the second DHCP information includes a second port number, the identifier of the second server, and an identifier of the second forwarding device, and a port identified by the second port number is a port of the second forwarding device for communicating with the second server, obtaining, by the controller, the information about the port connection between the first server and the first forwarding device according to the first port number, the identifier of the first server, and the identifier of the first forwarding device that are included in the first DHCP information, obtaining, by the controller, the information about the port connection between the second server and the second forwarding device according to the second port number, the identifier of the second server, and the identifier of the second forwarding device that are included in the second DHCP information, and obtaining, by the controller, the network topology information according to the information about the port connection between the first server and the first forwarding device and the information about the port connection between the second server and the second forwarding device.

For example, the controller may also obtain, by collecting the Gratuitous Address Resolution Protocol (GARP), an identifier of the server A, an identifier of the server B, a port of the server A for connecting to an adjacent forwarding device of the server A, and a port of the server B for connecting to an adjacent forwarding device of the server B.

A GARP packet reported by the server A using a port of the server A is sent to the controller by a forwarding device connected to the server A. The server A may further report a tenant number allocated to the server A, for example, a virtual extensible local area network (VXLAN) identifier, a virtual local area network (VLAN) identifier or the like, an identifier of a forwarding device connected to the server A, and a port number of the forwarding device connected to the server A. The server B may perform reporting in a same manner. In this way, the controller may learn locations, of the server A and the server B, in a network.

For example, the controller may obtain, according to an OpenFlow-based packet-in packet sent by any forwarding device, a forwarding device connected to a port of the server A and a forwarding device connected to a port of the server B. If the any forwarding device is a forwarding device connected to the server A, the forwarding device connected to the server A reports a first packet-in packet to the controller. A packet header of the first packet-in packet includes a port that receives a GRAP packet from the server A, and the first packet-in packet includes the GRAP packet from the server A. If the any forwarding device is a forwarding device connected to the server B, the forwarding device connected to the server B reports a second packet-in packet to the controller. A packet header of the second packet-in packet includes a port that receives a GRAP packet from the server B, and the second packet-in packet includes the GRAP packet from the server B.

Optionally, the network topology information further includes the information about the port connection between the third forwarding device and the first forwarding device and the information about the port connection between the third forwarding device and the second forwarding device, and the third forwarding device communicates with both the first forwarding device and the second forwarding device.

For example, that the controller obtains the information about the port connection between the third forwarding device and the first forwarding device and the information about the port connection between the third forwarding device and the second forwarding device includes that the controller receives a first LLDP message sent by the third forwarding device, where the first LLDP message includes a third port number, a fourth port number, an identifier of the third forwarding device, and an identifier of the first forwarding device, a port identified by the third port number is a port of the first forwarding device for communicating with the third forwarding device, and a port identified by the fourth port number is a port of the third forwarding device for communicating with the first forwarding device, the controller receives a second LLDP message sent by the third forwarding device, where the second LLDP message includes a fifth port number, a sixth port number, the identifier of the third forwarding device, and an identifier of the second forwarding device, a port identified by the fifth port number is a port of the third forwarding device for communicating with the second forwarding device, and a port identified by the sixth port number is a port of the second forwarding device for communicating with the third forwarding device, the controller obtains the information about the port connection between the third forwarding device and the first forwarding device according to the third port number, the fourth port number, the identifier of the third forwarding device, and the identifier of the first forwarding device that are included in the first LLDP message, and the controller obtains the information about the port connection between the third forwarding device and the second forwarding device according to the fifth port number, the sixth port number, the identifier of the third forwarding device, and the identifier of the second forwarding device that are included in the second LLDP message.

Figure 7:
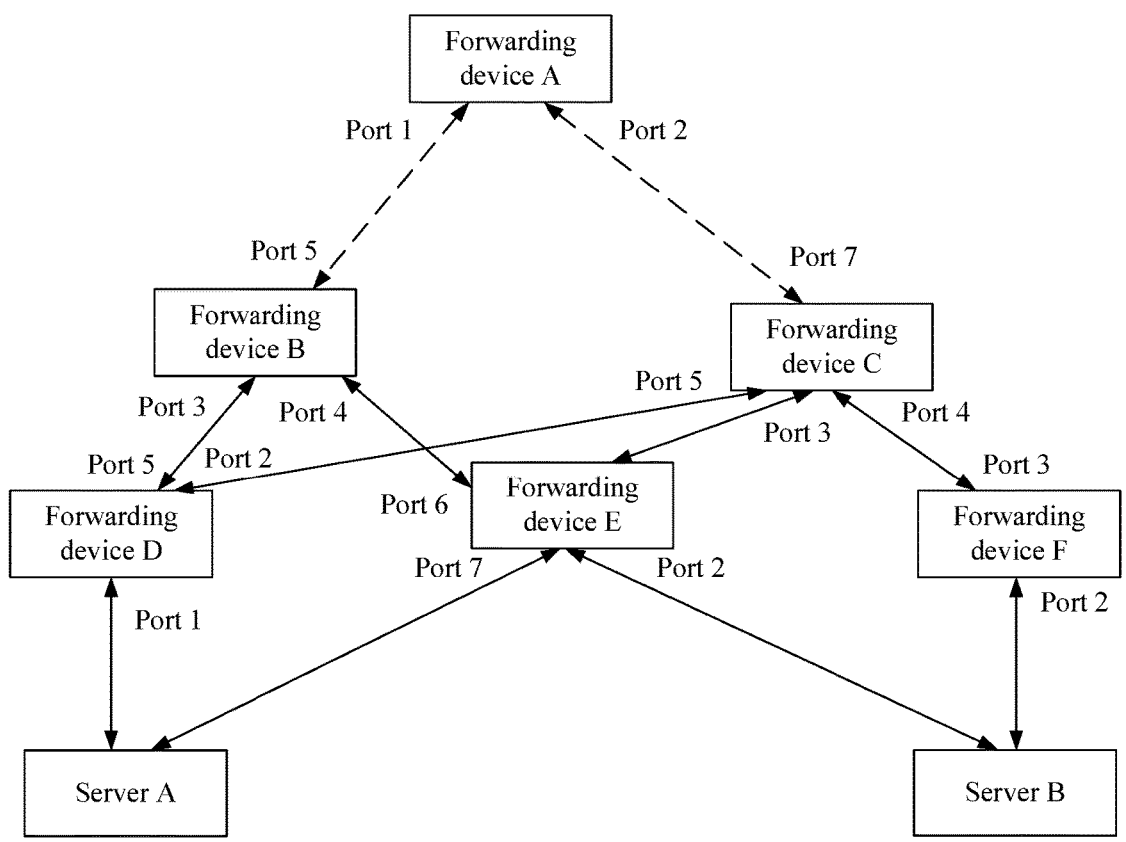
FIG. 7 is a system architecture diagram of a data center network according to an embodiment of the present disclosure.
Figure 8:
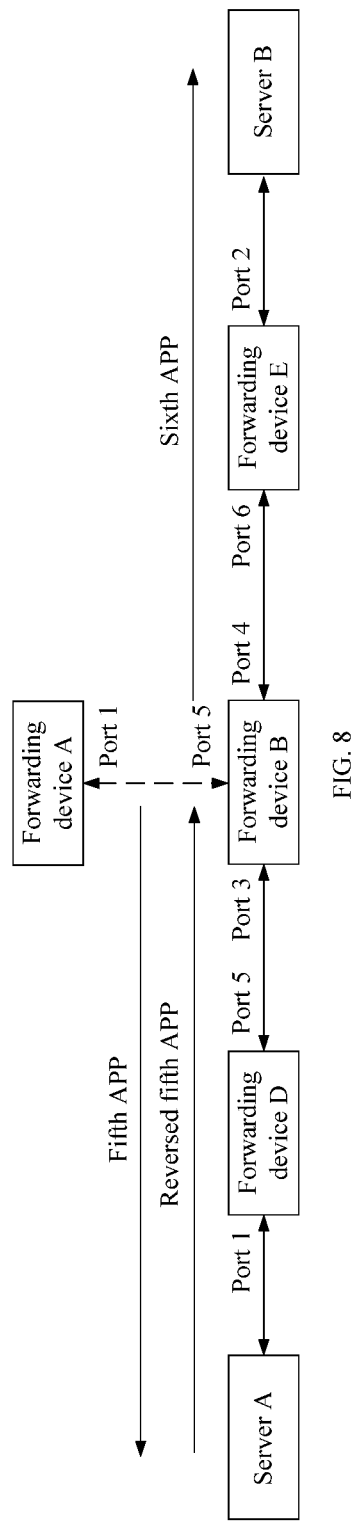
FIG. 8 is a schematic diagram of computing a PTPP in a data center network according to an embodiment of the present disclosure.

FIG. 7 is a system architecture diagram of a data center network according to an embodiment of the present disclosure. In the network shown in FIG. 7, a forwarding device A is a virtual node. That is, the forwarding device A in FIG. 7 may have no physical entity. A controller (not shown in FIG. 7) may communicate with any network device in FIG. 7. The forwarding device A, a forwarding device B, a forwarding device C, a forwarding device D, a forwarding device E, and a forwarding device F form a tree-shaped structure. The forwarding device B, the forwarding device C, the forwarding device D, the forwarding device E, and the forwarding device F are leaf nodes. Both the forwarding device D and the forwarding device E are connected to a server A. Both the forwarding device E and the forwarding device F are connected to a server B. FIG. 8 is a schematic diagram of computing a PTPP in a data center network according to an embodiment of the present disclosure. The forwarding device A is a virtual node, and therefore a link between the forwarding device A and the forwarding device B is a virtual link.

In the embodiment corresponding to FIG. 7, a method for determining a root node by a controller and a method for obtaining a first APP by the controller may be the same as those in the embodiment corresponding to FIG. 1. Details are not described herein again. A manner for obtaining port path information by the controller is different from the manner for obtaining port path information in the embodiment corresponding to FIG. 1.

A method for obtaining a second APP by the controller may include that the controller selects the second APP that includes a same port number as the first APP. The same port number identifies a port of the root node. Correspondingly, that the controller obtains a PTPP according to the first APP and the second APP includes that the controller removes a redundant portion of the first APP to obtain a third APP, where the redundant portion of the first APP is a portion of the first APP other than a port sequence, and the port sequence of the first APP includes a port that a logical link from the root node to a first server passes through, the controller removes a redundant portion of the second APP to obtain a fourth APP, where the redundant portion of the second APP is a portion of the second APP other than a port sequence, and the port sequence of the second APP includes a port that a logical link from the root node to a second server passes through, the controller removes a same prefix in the third APP and the fourth APP to obtain a fifth APP and a sixth APP, where the same prefix is a same port sequence included in the third APP and the fourth APP, the fifth APP is a port sequence obtained after the same prefix is removed from the third APP, and the sixth APP is a port sequence obtained after the same prefix is removed from the fourth APP, the controller reverses the fifth APP to obtain a reversed fifth APP, and the controller splices the reversed fifth APP and the sixth APP to obtain the PTPP.

As shown in FIG. 8, the first APP may be represented as [0,0,0,0,0,0,0,1,5,3,5,1], and the third APP obtained by the controller according to the first APP may be represented as [1,5,3,5,1]. The second APP may be represented as [0,0,0, 0,0,0,0,1,5,4,6,2], and the fourth APP obtained by the controller according to the second APP may be represented as [1,5,4,6,2]. The third APP and the fourth APP include the same prefix, that is, [1,5]. The fifth APP obtained by the controller by removing the same prefix from the third APP may be represented as [3,5,1]. The sixth APP obtained by the controller by removing the same prefix from the fourth APP may be represented as [4,6,2]. The reversed fifth APP may be represented as [1,5,3]. The PTPP obtained by the controller may be represented as [1,5,3,4,6,2]. That is, a link corresponding to the PTPP may be represented as a port 1 of the forwarding device D→a port 5 of the forwarding device D→a port 3 of the forwarding device B→a port 4 of the forwarding device B→a port 6 of the forwarding device E→a port 2 of the forwarding device E.

Optionally, that the controller splices the reversed fifth APP and the sixth APP to obtain the PTPP includes that the controller splices the reversed fifth APP and the sixth APP to obtain a seventh APP, and the controller removes a port in an odd-numbered location in a port sequence included in the seventh APP to obtain the PTPP.

As shown in FIG. 8, the seventh APP may be represented as [1,5,3,4,6,2]. That is, a link corresponding to the seventh APP may be represented as the port 1 of the forwarding device D→the port 5 of the forwarding device D→the port 3 of the forwarding device B→the port 4 of the forwarding device B→the port 6 of the forwarding device E→the port 2 of the forwarding device E. The controller obtains the PTPP represented as [5,4,2] by removing port numbers in odd-numbered locations in [1,5,3,4,6,2]. In [5,4,2], 5, 4, and 2 respectively represent output ports of the forwarding device D, the forwarding device B, and the forwarding device E. This further simplifies the port sequence.

Figure 9:
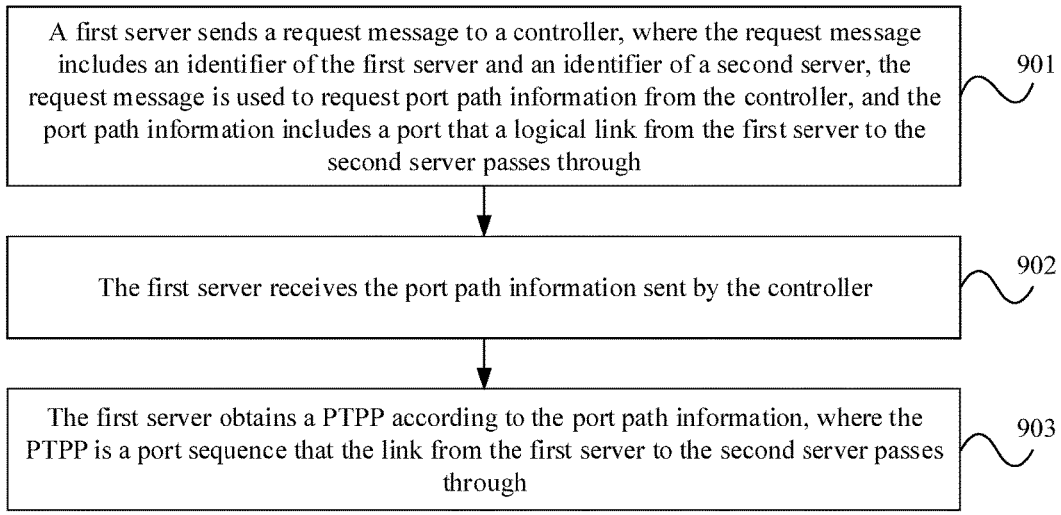
FIG. 9 is a flowchart of a method for obtaining a port path according to an embodiment of the present disclosure.

FIG. 9 is a flowchart of a method for obtaining a port path according to an embodiment of the present disclosure. FIG. 9 illustrates the method for obtaining a port path according to this embodiment of the present disclosure from the perspective of a first server side. The first server may be used as a source node, and correspondingly, a second server may be used as a destination node. With reference to FIG. 9, the method for obtaining a port path according to this embodiment of the present disclosure is described.

Step 901: The first server sends a request message to a controller, where the request message includes an identifier of the first server and an identifier of the second server, the request message is used to request port path information from the controller, and the port path information includes a port that a logical link from the first server to the second server passes through.

For example, the identifier of the first server is the same as the identifier of the first server in the embodiment corresponding to FIG. 1, the identifier of the second server is the same as the identifier of the second server in the embodiment corresponding to FIG. 1, and the request message may be the same as the request message in the embodiment corresponding to FIG. 1.

Step 902: The first server receives the port path information sent by the controller.

For example, the port path information may include the first APP and the second APP in the embodiment corresponding to FIG. 1, or the port information may be the PTPP in the embodiment corresponding to FIG. 1. The first APP includes a port that a logical link from a root node to the first server passes through. The second APP includes a port that a logical link from the root node to the second server passes through.

Step 903: The first server obtains a PTPP according to the port path information, where the PTPP is a port sequence that the link from the first server to the second server passes through.

For example, if the port information is the PTPP, the first server may directly obtain the PTPP from the port path information. If the port information includes the first APP and the second APP, the first server may generate the PTPP according to the first APP and the second APP. The root node is a physical node or a virtual node. A method for generating the PTPP by the first server is the same as the method for generating a PTPP by the controller in the embodiment corresponding to FIG. 1, and details are not described herein again.

Figure 10:
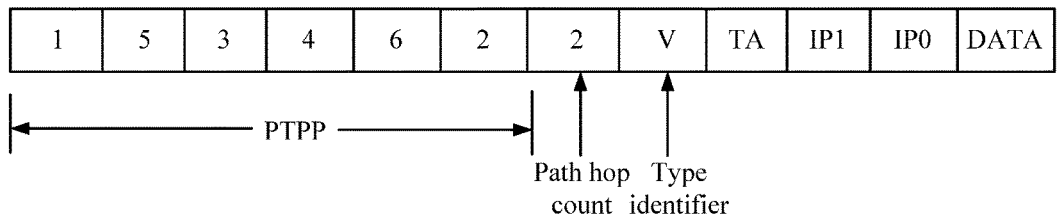
FIG. 10 is a schematic diagram of packet encapsulation according to an embodiment of the present disclosure.

FIG. 10 is a schematic diagram of packet encapsulation according to an embodiment of the present disclosure.

Figure 11:
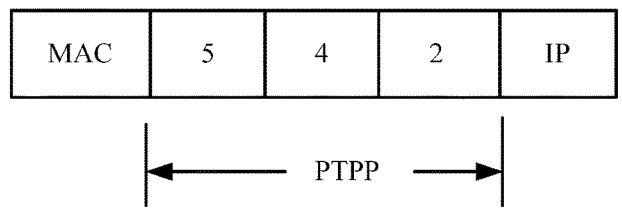
FIG. 11 is another schematic diagram of packet encapsulation according to an embodiment of the present disclosure.

FIG. 11 is another schematic diagram of packet encapsulation according to an embodiment of the present disclosure.

Optionally, after step 903, the method provided in this embodiment of the present disclosure further includes adding, by the first server, the PTPP to a first packet to obtain a second packet, where the first packet is a packet sent by the first server to the second server, and sending, by the first server, the second packet to the second server.

As shown in FIG. 10, for example, adding, by the first server, the PTPP to a first packet to obtain a second packet includes obtaining, by the first server, a path hop count corresponding to the PTPP, where a packet header of the first packet includes a MAC field, and the path hop count is used to identify a location, in the PTPP, of a port that sends the second packet, and adding, by the first server, the PTPP, the path hop count, and a type identifier to the MAC field, where the type identifier is used to indicate that the second packet includes the PTPP.

For example, the first packet includes an MPLS field, and adding, by the first server, the PTPP to a first packet to obtain a second packet includes adding, by the first server, the PTPP to the MPLS field to obtain the second packet. A port sequence included in the PTPP may be popped up and/ pushed into a packet in a manner specified in the MPLS, and details are not described herein.

As shown in FIG. 10, the PTPP is encapsulated before an IP header to replace a MAC address. The PTPP may be represented by 12 bytes. The path hop count may be represented by one byte. The path hop count is initialized to 0 when the first server obtains the second packet, and subsequently, each forwarding device increases the value by a preset value after forwarding. The type identifier may be represented by one byte. Herein, the type identifier, different from a common version number in a MAC header, is used to identify that the second packet includes the PTPP. Tenant information such as VLAN is still used as an optional option, and is stored in a TA field.

As shown in FIG. 11, the first server encapsulates the PTPP into the MPLS field to obtain the second packet. A forwarding device that receives the second packet reads a topmost port number of the PTPP, and uses the topmost port number as an output port. The forwarding device that receives the second packet may delete the topmost port number of the PTPP to obtain a third packet. The forwarding device that receives the second packet sends the third packet to the second server using the output port.

Figure 12:
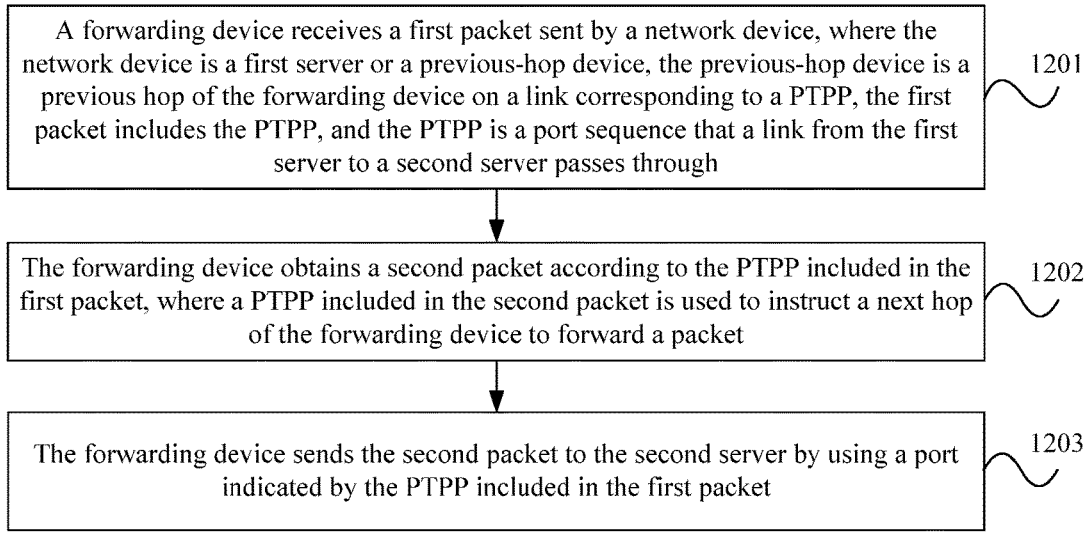
FIG. 12 is a flowchart of a method for forwarding a packet based on a port path according to an embodiment of the present disclosure.

FIG. 12 is a flowchart of a method for forwarding a packet based on a port path according to an embodiment of the present disclosure. FIG. 12 illustrates the method for forwarding a packet based on a port path according to this embodiment of the present disclosure from the perspective of a forwarding device side. With reference to FIG. 12, the method for forwarding a packet based on a port path according to this embodiment of the present disclosure is described.

Step 1201: The forwarding device receives a first packet sent by a network device, where the network device is a first server or a previous-hop device, the previous-hop device is a previous hop of the forwarding device on a link corresponding to a PTPP, the first packet includes the PTPP, and the PTPP is a port sequence that a link from the first server to a second server passes through.

For example, as shown in FIG. 3, when the forwarding device is a forwarding device D and receives the first packet sent by the network device, the network device is the first server, that is, a server A, the first packet includes the PTPP, and the PTPP is a port sequence that the link from the first server to the second server (a server B) passes through. For example, the PTPP may be represented as [1,5,3,4,6,2]. That is, the link corresponding to the PTPP may be represented as a port 1 of the forwarding device D→a port 5 of the forwarding device D→a port 3 of a forwarding device B→a port 4 of the forwarding device B→a port 6 of a forwarding device E→a port 2 of the forwarding device E. When the forwarding device is the forwarding device B and receives the first packet sent by the network device, the network device is a previous-hop device, that is, the forwarding device D.

Step 1202: The forwarding device obtains a second packet according to the PTPP included in the first packet, where a PTPP included in the second packet is used to instruct a next hop of the forwarding device to forward a packet.

For example, if the first packet further includes a path hop count, and each port included in the PTPP included in the first packet is an output port, that the forwarding device obtains a second packet includes that the forwarding device obtains an updated path hop count according to the path hop count included in the first packet, where a difference between the updated path hop count and the path hop count that is included in the first packet is a first preset value, and the forwarding device replaces the path hop count included in the first packet with the updated path hop count to obtain the second packet. The path hop count in this embodiment of the present disclosure has a same meaning as the path hop count in the embodiment corresponding to FIG. 1 or FIG. 9, and details are not described herein again. A port number of the PTPP that corresponds to the updated path hop count and that is included in the second packet identifies an output port of a next hop. The next hop is a next-hop device of the forwarding device on a link corresponding to the PTPP. The first preset value may be 1.

For example, if the first packet further includes a path hop count, that the forwarding device obtains a second packet includes that the forwarding device obtains an updated path hop count according to the path hop count included in the first packet, where a difference between the updated path hop count and the path hop count that is included in the first packet is a second preset value, and the forwarding device replaces the path hop count included in the first packet with the updated path hop count to obtain the second packet. The path hop count in this embodiment of the present disclosure has a same meaning as the path hop count in the embodiment corresponding to FIG. 1 or FIG. 9, and details are not described herein again. A port number of the PTPP that corresponds to the updated path hop count and that is included in the second packet identifies an input port of a next hop. The next hop is a next-hop device of the forwarding device on a link corresponding to the PTPP. The second preset value may be 2.

For example, if an MPLS field of the first packet includes the PTPP, and each port included in the PTPP included in the first packet is an output port, that the forwarding device obtains a second packet includes that the forwarding device pops up a topmost port number in the MPLS field to obtain the second packet. The topmost port number in the MPLS field of the second packet is used to identify an output port of the next hop.

For example, if an MPLS field of the first packet includes the PTPP, that the forwarding device obtains a second packet includes that the forwarding device pops up a topmost port number in the MPLS field and a port number adjacent to the topmost port number to obtain the second packet. The topmost port number in the MPLS field of the second packet is used to identify an input port of the next hop.

As shown in FIG. 3, the forwarding device D obtains the second packet according to the PTPP included in the first packet. The PTPP included in the second packet is used to instruct a next hop (the forwarding device B) of the forwarding device to send a packet using a port 4.

Step 1203: The forwarding device sends the second packet to the second server using a port indicated by the PTPP included in the first packet.

For example, a packet header of the first packet includes a MAC field, the MAC field includes the PTPP, the path hop count, and a type identifier, the path hop count is used to identify a location of a port in the PTPP, the type identifier is used to indicate that the first packet includes the PTPP. That the forwarding device sends the second packet to the second server using a port indicated by the PTPP included in the first packet includes that the forwarding device obtains the type identifier from the MAC field, after determining, according to the type identifier, that the first packet includes the path hop count, the forwarding device obtains the PTPP and the path hop count from the MAC field, the forwarding device selects, from the PTPP according to the path hop count included in the first packet, a port used to send the second packet, and the forwarding device sends the second packet to the second server using the port used to send the second packet.

As shown in FIG. 3 and FIG. 10, if the forwarding device is the forwarding device D, and the path hop count included in the first packet is 2, the forwarding device D sends the second packet to the server B using the port indicated by the PTPP included in the first packet, such as the port 5 of the forwarding device D in FIG. 3. The path hop count in the second packet may be 3 or 4. As shown in FIG. 3, if the forwarding device is the forwarding device B, and a path hop count obtained by the forwarding device B from a packet that is from the forwarding device D is 3, the forwarding device B may first update the path hop count to obtain a port that is used by the forwarding device B to send the second packet, that is, the port 4. The forwarding device B may further update the path hop count of the first packet to obtain the second packet, where the updated path hop count is 5 or 6. The forwarding device B sends the second packet to the server B using the port 4 on the forwarding device B. The path hop count in the second packet may be changed to 5 by the forwarding device.

For example, a packet header of the first packet includes an MPLS field, and the MPLS field includes the PTPP. That the forwarding device sends the second packet to the second server using a port indicated by the PTPP included in the first packet includes that the forwarding device obtains a topmost port number from the MPLS field, and the forwarding device sends the second packet to the second server using a port identified by the topmost port number.

As shown in FIG. 3 and FIG. 11, if the forwarding device is the forwarding device D, a structure of the packet header of the first packet may be a structure shown in FIG. 11. The forwarding device D determines, according to the topmost port number, that is a port 5, in the MPLS field in the first packet, that a port that is of the forwarding device D and that is used to send the second packet is the port 5. The forwarding device D may pop up the topmost port number in the MPLS field in the first packet to obtain the second packet. The PTPP in the second packet includes [4,2]. The forwarding device D sends the second packet to the forwarding device B using the port 5 of the forwarding device D. The topmost port number in the MPLS field in the second packet received by the forwarding device B is 4, that is, the forwarding device B needs to send a packet to the server B using the port 4 of the forwarding device B.

Figure 13:
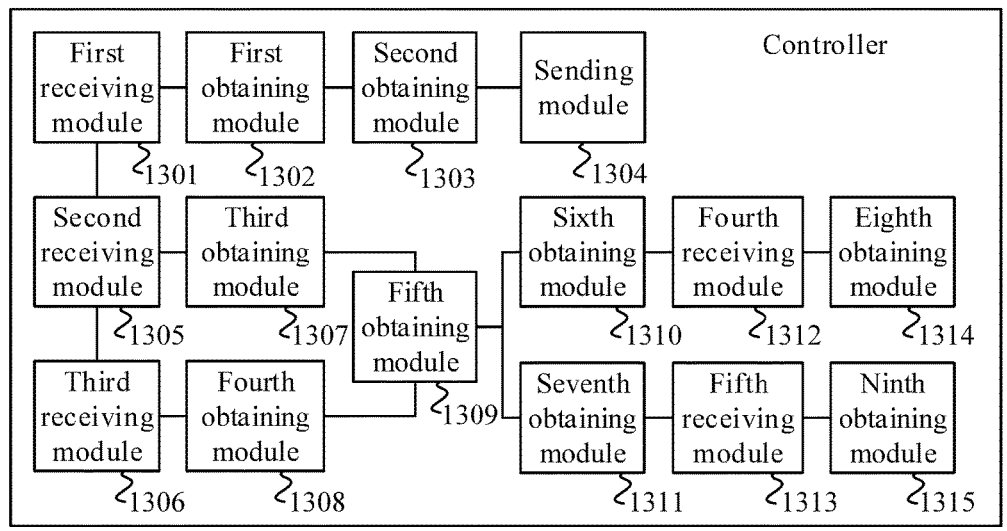
FIG. 13 is a schematic structural diagram of a controller according to an embodiment of the present disclosure.

FIG. 13 is a schematic structural diagram of a controller according to an embodiment of the present disclosure. The controller in this embodiment of the present disclosure may use the method provided in the embodiment corresponding to FIG. 1. As shown in FIG. 13, the controller in this embodiment includes a first receiving module 1301, a first obtaining module 1302, a second obtaining module 1303, and a sending module 1304.

The first receiving module 1301 is configured to receive a request message from a first server, where the request message includes an identifier of the first server and an identifier of a second server, the request message is used to request port path information from the controller, and the port path information includes a port that a logical link from the first server to the second server passes through.

The first obtaining module 1302 is configured to obtain a first APP and a second APP according to network topology information, the identifier of the first server, and the identifier of the second server, where the network topology information includes information about a port connection between the first server and a first forwarding device and information about a port connection between the second server and a second forwarding device, the first forwarding device communicates with the first server, the second forwarding device communicates with the second server, the first APP includes a port that a logical link from a root node to the first server passes through, and the second APP includes a port that a logical link from the root node to the second server passes through.

The second obtaining module 1303 is configured to obtain the port path information according to the first APP and the second APP.

The sending module 1304 is configured to send the port path information to the first server.

For example, the first obtaining module 1302 is further configured to determine the root node according to the network topology information, where the root node is a node serving as a root of a tree, and leaf nodes of the tree include the first forwarding device and the second forwarding device, obtain information about the root node, where the information about the root node includes an identifier of the root node, a seventh port number, and an eighth port number, a port identified by the seventh port number is a port that is of the root node and that can communicate with the first server, and a port identified by the eighth port number is a port that is of the root node and that can communicate with the second server, obtain the first APP according to the network topology information, the identifier of the first server, and the information about the root node, and obtain the second APP according to the network topology information, the identifier of the second server, and the information about the root node.

For example, when the first obtaining module 1302 is configured to obtain the first APP according to the network topology information, the identifier of the first server, and the information about the root node, the first obtaining module 1302 is further configured to obtain a first APP set according to the network topology information, the identifier of the first server, and the information about the root node, where the first APP set includes at least one first APP, and the at least one first APP corresponds to the first server, and select one first APP from the first APP set as the first APP.

Optionally, when the first obtaining module 1302 is configured to select one first APP from the first APP set as the first APP, the first obtaining module 1302 is further configured to select the first APP from the first APP set according to link status information of a logical link corresponding to the at least one first APP, where the link status information is used to identify whether congestion occurs on the logical link, and the first APP does not include a congested link.

For example, when the first obtaining module 1302 is configured to obtain the second APP according to the network topology information, the identifier of the second server, and the information about the root node, the first obtaining module 1302 is further configured to obtain a second APP set according to the network topology information, the identifier of the second server, and the information about the root node, where the second APP set includes at least one second APP, and the at least one second APP corresponds to the second server, and select one second APP from the second APP set as the second APP.

Optionally, when the first obtaining module 1302 is configured to select one second APP from the second APP set as the second APP, the first obtaining module 1302 is further configured to select one second APP from the second APP set as the second APP according to the first APP, where the second APP and the first APP include a same port number, and the same port number is the seventh port number or the eighth port number.

Optionally, when the first obtaining module 1302 is configured to select one second APP from the second APP set as the second APP, the first obtaining module 1302 is further configured to select N second APPs from the second APP set according to the first APP, where N is an integer greater than or equal to 1, any second APP of the N second APPs and the first APP include a same port number, and the same port number is the seventh port number or the eighth port number, and select the second APP from the N second APPs according to link status information of a logical link corresponding to the N second APPs, where the link status information is used to identify whether congestion occurs on the logical link, and the second APP does not include a congested link.

For example, in a manner, the root node is a physical node, the port path information is a PTPP, and the second obtaining module 1303 is further configured to remove a redundant portion of the first APP to obtain a third APP, where the redundant portion of the first APP is a portion of the first APP other than a port sequence, and the port sequence of the first APP includes the port that the logical link from the root node to the first server passes through, remove a redundant portion of the second APP to obtain a fourth APP, where the redundant portion of the second APP is a portion of the second APP other than a port sequence, and the port sequence of the second APP includes the port that the logical link from the root node to the second server passes through, reverse the third APP to obtain a reversed third APP, and splice the reversed third APP and the fourth APP to obtain the PTPP.

For example, in another manner, the port path information is a PTPP, and the second obtaining module 1303 is further configured to remove a redundant portion of the first APP to obtain a third APP, where the redundant portion of the first APP is a portion of the first APP other than a port sequence, and the port sequence of the first APP includes the port that the logical link from the root node to the first server passes through, remove a redundant portion of the second APP to obtain a fourth APP, where the redundant portion of the second APP is a portion of the second APP other than a port sequence, and the port sequence of the second APP includes the port that the logical link from the root node to the second server passes through, remove a same prefix in the third APP and the fourth APP to obtain a fifth APP and a sixth APP, where the same prefix is a same port sequence included in the third APP and the fourth APP, the fifth APP is a port sequence obtained after the same prefix is removed from the third APP, and the sixth APP is a port sequence obtained after the same prefix is removed from the fourth APP, reverse the fifth APP to obtain a reversed fifth APP, and splice the reversed fifth APP and the sixth APP to obtain the PTPP.

Optionally, when the second obtaining module 1303 is configured to splice the reversed fifth APP and the sixth APP to obtain the PTPP, the second obtaining module 1303 is further configured to splice the reversed fifth APP and the sixth APP to obtain a seventh APP, and remove a port in an odd-numbered location in a port sequence included in the seventh APP to obtain the PTPP.

Optionally, the network topology information further includes information about a port connection between a third forwarding device and the first forwarding device and information about a port connection between the third forwarding device and the second forwarding device, and the third forwarding device communicates with both the first forwarding device and the second forwarding device.

Optionally, in an implementation for obtaining the network topology information by the controller, the controller further includes a second receiving module 1305, a third receiving module 1306, a third obtaining module 1307, a fourth obtaining module 1308, and a fifth obtaining module 1309.

The second receiving module 1305 is configured to receive a first packet sent by the first forwarding device, where the first packet includes a first port number, the identifier of the first server, and an identifier of the first forwarding device, and a port identified by the first port number is a port of the first forwarding device for communicating with the first server.

The third receiving module 1306 is configured to receive a second packet sent by the second forwarding device, where the second packet includes a second port number, the identifier of the second server, and an identifier of the second forwarding device, and a port identified by the second port number is a port of the second forwarding device for communicating with the second server.

The third obtaining module 1307 is configured to obtain the information about the port connection between the first server and the first forwarding device according to the first port number, the identifier of the first server, and the identifier of the first forwarding device that are included in the first packet.

The fourth obtaining module 1308 is configured to obtain the information about the port connection between the second server and the second forwarding device according to the second port number, the identifier of the second server, and the identifier of the second forwarding device that are included in the second packet.

The fifth obtaining module 1309 is configured to obtain the network topology information according to the information about the port connection between the first server and the first forwarding device and the information about the port connection between the second server and the second forwarding device.

Optionally, in another implementation for obtaining the network topology information by the controller, the controller further includes a sixth obtaining module 1310, a seventh obtaining module 1311, a third obtaining module 1307, a fourth obtaining module 1308, and a fifth obtaining module 1309.

The sixth obtaining module 1310 is configured to obtain first DHCP information allocated by the controller to the first server, where the first DHCP information includes a first port number, the identifier of the first server, and an identifier of the first forwarding device, and a port identified by the first port number is a port of the first forwarding device for communicating with the first server.

The seventh obtaining module 1311 is configured to obtain second DHCP information allocated by the controller to the second server, where the second DHCP information includes a second port number, the identifier of the second server, and an identifier of the second forwarding device, and a port identified by the second port number is a port of the second forwarding device for communicating with the second server.

The third obtaining module 1307 is configured to obtain the information about the port connection between the first server and the first forwarding device according to the first port number, the identifier of the first server, and the identifier of the first forwarding device that are included in the first DHCP information.

The fourth obtaining module 1308 is configured to obtain the information about the port connection between the second server and the second forwarding device according to the second port number, the identifier of the second server, and the identifier of the second forwarding device that are included in the second DHCP information.

The fifth obtaining module 1309 is configured to obtain the network topology information according to the information about the port connection between the first server and the first forwarding device and the information about the port connection between the second server and the second forwarding device.

Optionally, in a manner for obtaining information about a port connection between forwarding devices by the controller, the controller further includes a fourth receiving module 1312, a fifth receiving module 1313, an eighth obtaining module 1314, and a ninth obtaining module 1315.

The fourth receiving module 1312 is configured to receive a first LLDP message sent by the third forwarding device, where the first LLDP message includes a third port number, a fourth port number, an identifier of the third forwarding device, and an identifier of the first forwarding device, a port identified by the third port number is a port of the first forwarding device for communicating with the third forwarding device, and a port identified by the fourth port number is a port of the third forwarding device for communicating with the first forwarding device.

The fifth receiving module 1313 is configured to receive a second LLDP message sent by the third forwarding device, where the second LLDP message includes a fifth port number, a sixth port number, the identifier of the third forwarding device, and an identifier of the second forwarding device, a port identified by the fifth port number is a port of the third forwarding device for communicating with the second forwarding device, and a port identified by the sixth port number is a port of the second forwarding device for communicating with the third forwarding device.

The eighth obtaining module 1314 is configured to obtain the information about the port connection between the third forwarding device and the first forwarding device according to the third port number, the fourth port number, the identifier of the third forwarding device, and the identifier of the first forwarding device that are included in the first LLDP message.

The ninth obtaining module 1315 is configured to obtain the information about the port connection between the third forwarding device and the first forwarding device according to the fifth port number, the sixth port number, the identifier of the third forwarding device, and the identifier of the second forwarding device that are included in the second LLDP message.

The controller in this embodiment may be configured to execute the technical solution in the method embodiment shown in FIG. 1 to FIG. 8. Implementation principles and technical effects thereof are similar, and details are not described herein again.

Figure 14:
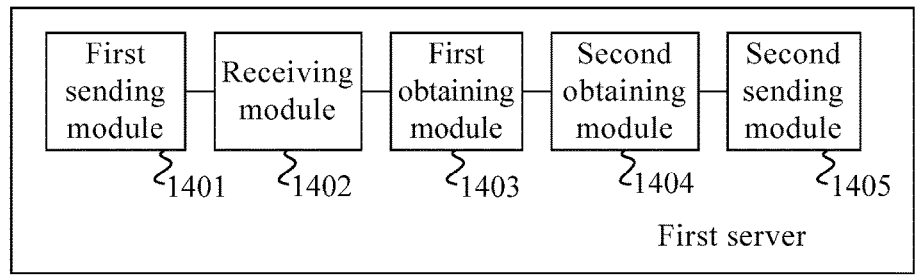
FIG. 14 is a schematic structural diagram of a first server according to an embodiment of the present disclosure.

FIG. 14 is a schematic structural diagram of a first server according to an embodiment of the present disclosure. As shown in FIG. 14, the server in this embodiment includes a first sending module 1401, a receiving module 1402, and a first obtaining module 1403.

The first sending module 1401 is configured to send a request message to a controller, where the request message includes an identifier of the first server and an identifier of a second server, the request message is used to request port path information from the controller, and the port path information includes a port that a logical link from the first server to the second server passes through.

The receiving module 1402 is configured to receive the port path information sent by the controller.

The first obtaining module 1403 is configured to obtain a PTPP according to the port path information, where the PTPP is a port sequence that the link from the first server to the second server passes through.

Optionally, the first server further includes a second obtaining module 1404 and a second sending module 1405.

The second obtaining module 1404 is configured to add the PTPP to a first packet to obtain a second packet, where the first packet is a packet sent by the first server to the second server.

The second sending module 1405 is configured to send the second packet to the second server.

For example, in an implementation, the port path information includes a first APP and a second APP, the first APP includes a port that a logical link from a root node to the first server passes through, the second APP includes a port that a logical link from the root node to the second server passes through, the root node is a physical node, and the first obtaining module 1403 is further configured to remove a redundant portion of the first APP to obtain a third APP, where the redundant portion of the first APP is a portion of the first APP other than a port sequence, and the port sequence of the first APP includes the port that the logical link from the root node to the first server passes through, remove a redundant portion of the second APP to obtain a fourth APP, where the redundant portion of the second APP is a portion of the second APP other than a port sequence, and the port sequence of the second APP includes the port that the logical link from the root node to the second server passes through, reverse the third APP to obtain a reversed third APP, and splice the reversed third APP and the fourth APP to obtain the PTPP.

For example, in another implementation, the port path information includes a first APP and a second APP, the first APP includes a port that a logical link from a root node to the first server passes through, the second APP includes a port that a logical link from the root node to the second server passes through, and the first obtaining module 1403 is further configured to remove a redundant portion of the first APP to obtain a third APP, where the redundant portion of the first APP is a portion of the first APP other than a port sequence, and the port sequence of the first APP includes the port that the logical link from the root node to the first server passes through, remove a redundant portion of the second APP to obtain a fourth APP, where the redundant portion of the second APP is a portion of the second APP other than a port sequence, and the port sequence of the second APP includes the port that the logical link from the root node to the second server passes through, remove a same prefix in the third APP and the fourth APP to obtain a fifth APP and a sixth APP, where the same prefix is a same port sequence included in the third APP and the fourth APP, the fifth APP is a port sequence obtained after the same prefix is removed from the third APP, and the sixth APP is a port sequence obtained after the same prefix is removed from the fourth APP, reverse the fifth APP to obtain a reversed fifth APP, and splice the reversed fifth APP and the sixth APP to obtain the PTPP.

Optionally, when the first obtaining module 1403 is configured to splice the reversed fifth APP and the sixth APP to obtain the PTPP, the first obtaining module 1403 is further configured to splice the reversed fifth APP and the sixth APP to obtain a seventh APP, and remove a port in an odd-numbered location in a port sequence included in the seventh APP to obtain the PTPP.

For example, in an implementation, the second obtaining module 1404 is further configured to obtain a path hop count corresponding to the PTPP, where a packet header of the first packet includes a MAC field, and the path hop count is used to identify a location, in the PTPP, of a port that sends the second packet, and add the PTPP, the path hop count, and a type identifier to the MAC field, where the type identifier is used to indicate that the second packet includes the PTPP.

For example, in another implementation, the second packet includes an MPLS field, and the second obtaining module 1404 is further configured to add the PTPP to the MPLS field to obtain the second packet.

The first server in this embodiment may be configured to execute the technical solution in the method embodiment shown in FIG. 9 to FIG. 11. Implementation principles and technical effects thereof are similar, and details are not described herein again.

Figure 15:
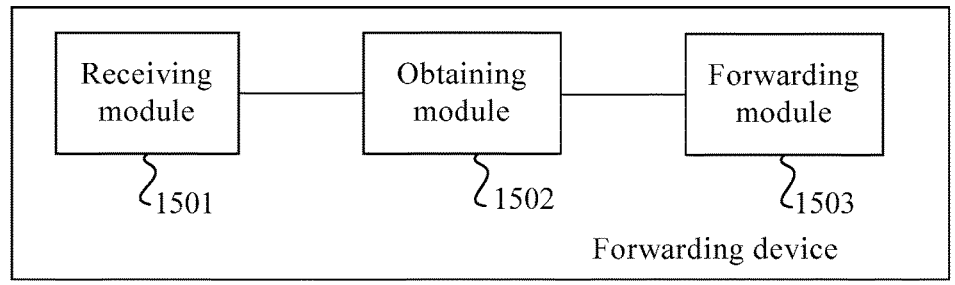
FIG. 15 is a schematic structural diagram of a forwarding device according to an embodiment of the present disclosure.

FIG. 15 is a schematic structural diagram of a forwarding device according to an embodiment of the present disclosure. As shown in FIG. 15, the forwarding device in this embodiment includes a receiving module 1501, an obtaining module 1502, and a forwarding module 1503.

The receiving module 1501 is configured to receive a first packet sent by a network device. The network device is a first server or a previous-hop device, the previous-hop device is a previous hop of the forwarding device on a link corresponding to a PTPP, the first packet includes the PTPP, and the PTPP is a port sequence that a link from the first server to a second server passes through.

The obtaining module 1502 is configured to obtain a second packet according to the PTPP included in the first packet. A PTPP included in the second packet is used to instruct a next hop of the forwarding device to forward a packet.

The forwarding module 1503 is configured to send the second packet to the second server using a port indicated by the PTPP included in the first packet.

For example, in an implementation, a packet header of the first packet includes a MAC field, the MAC field includes the PTPP, a path hop count, and a type identifier, the path hop count is used to identify a location of a port in the PTPP, the type identifier is used to indicate that the first packet includes the PTPP, and the forwarding module 1503 is further configured to obtain the type identifier from the MAC field, obtain the PTPP and the path hop count from the MAC field after determining, according to the type identifier, that the first packet includes the path hop count, select, from the PTPP according to the path hop count included in the first packet, a port used to send the second packet, and send the second packet to the second server using the port used to send the second packet.

For example, in another implementation, a packet header of the first packet includes an MPLS field, and the MPLS field includes the PTPP, the path hop count, and the type identifier. The forwarding module 1503 is further configured to obtain a topmost port number from the MPLS field, and send the second packet to the second server using a port identified by the topmost port number.

The forwarding device in this embodiment may be configured to execute the technical solution in the method embodiment shown in FIG. 12. Implementation principles and technical effects thereof are similar, and details are not described herein again.

Figure 16:
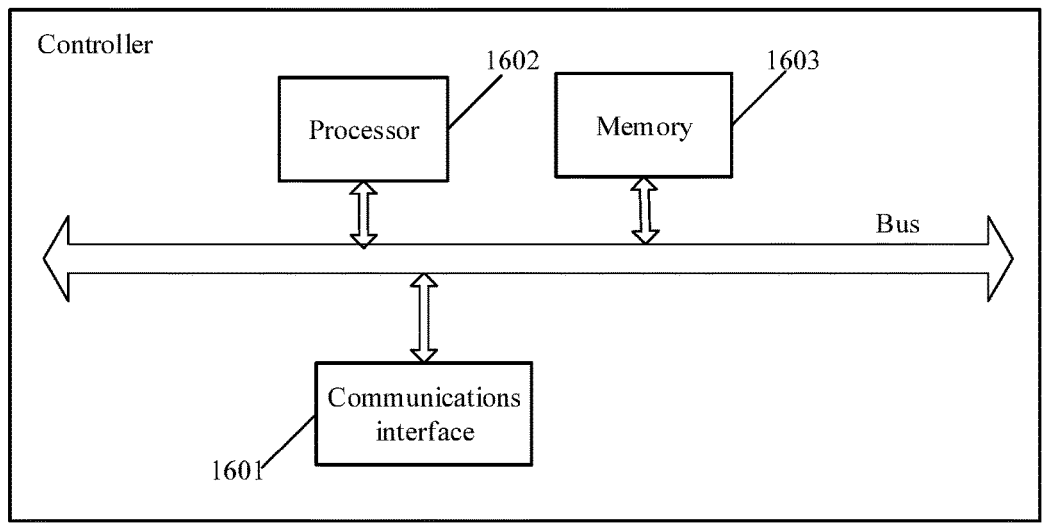
FIG. 16 is a schematic structural diagram of a controller according to an embodiment of the present disclosure.

FIG. 16 is a schematic structural diagram of a controller according to an embodiment of the present disclosure. As shown in FIG. 16, the controller in this embodiment includes a communications interface 1601, a processor 1602, and a memory 1603. The communications interface 1601, the processor 1602, and the memory 1603 are connected with each other using a bus.

The memory 1603 stores a program. Further, the program may include program code, and the program code includes a computer operation instruction. The memory 1603 may include a random access memory (RAM), and may further include a nonvolatile memory, for example, at least one disk memory.

The processor 1602 runs the program in the memory 1603, and is configured to perform the following operations of receiving a request message from a first server, where the request message includes an identifier of the first server and an identifier of a second server, the request message is used to request port path information from the controller, and the port path information includes a port that a logical link from the first server to the second server passes through, obtaining a first APP and a second APP according to network topology information, the identifier of the first server, and the identifier of the second server, where the network topology information includes information about a port connection between the first server and a first forwarding device and information about a port connection between the second server and a second forwarding device, the first forwarding device communicates with the first server, the second forwarding device communicates with the second server, the first APP includes a port that a logical link from a root node to the first server passes through, and the second APP includes a port that a logical link from the root node to the second server passes through, obtaining the port path information according to the first APP and the second APP, and sending the port path information to the first server.

For an implementation principle and a technical effect thereof, reference may be made to the method embodiment shown in FIG. 1 to FIG. 8, and details are not described herein again. The controller in this embodiment of the present disclosure may be the controller shown in FIG. 13, and details are not described herein again.

The processor 1602 may be a general purpose processor, including a central processing unit (CPU), a network processor (NP), or the like, or may be another programmable logic device, a discrete gate or a transistor logic device, or a discrete hardware component.

Figure 17:
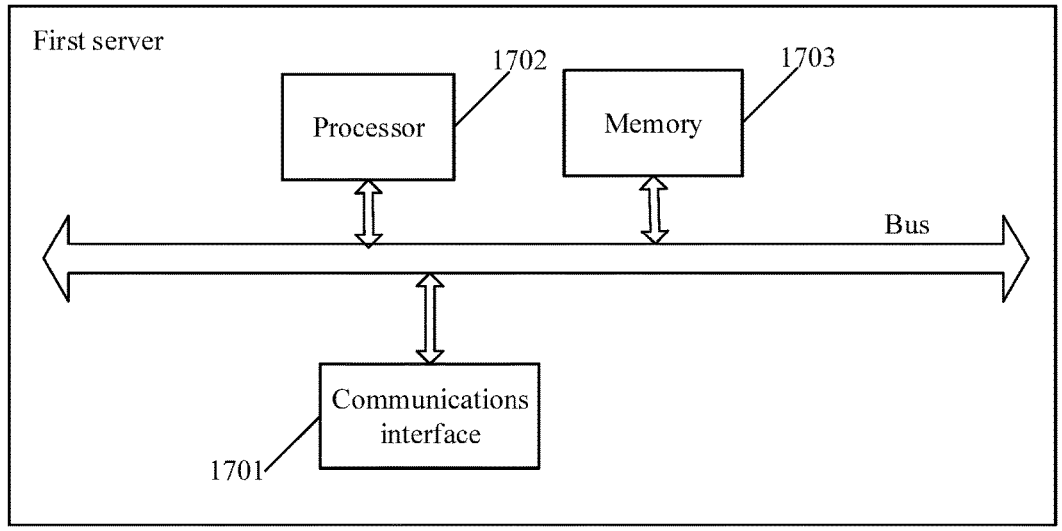
FIG. 17 is a schematic structural diagram of a first server according to an embodiment of the present disclosure.

FIG. 17 is a schematic structural diagram of a first server according to an embodiment of the present disclosure. As shown in FIG. 17, the first server in this embodiment includes a communications interface 1701, a processor 1702, and a memory 1703. The communications interface 1701, the processor 1702, and the memory 1703 are connected with each other using a bus.

The processor 1702 runs a program in the memory 1703, and is configured to perform the following operations of sending a request message to a controller, where the request message includes an identifier of the first server and an identifier of a second server, the request message is used to request port path information from the controller, and the port path information includes a port that a logical link from the first server to the second server passes through, receiving the port path information sent by the controller, and obtaining a PTPP according to the port path information, where the PTPP is a port sequence that the link from the first server to the second server passes through.

For an implementation principle and a technical effect thereof, reference may be made to the method embodiment shown in FIG. 9 to FIG. 11, and details are not described herein again. The first server in this embodiment of the present disclosure may be the server shown in FIG. 14, and details are not described herein again.

The processor 1702 may be a general purpose processor, including a CPU, an NP, or the like, or may be another programmable logic device, a discrete gate or a transistor logic device, or a discrete hardware component.

Figure 18:
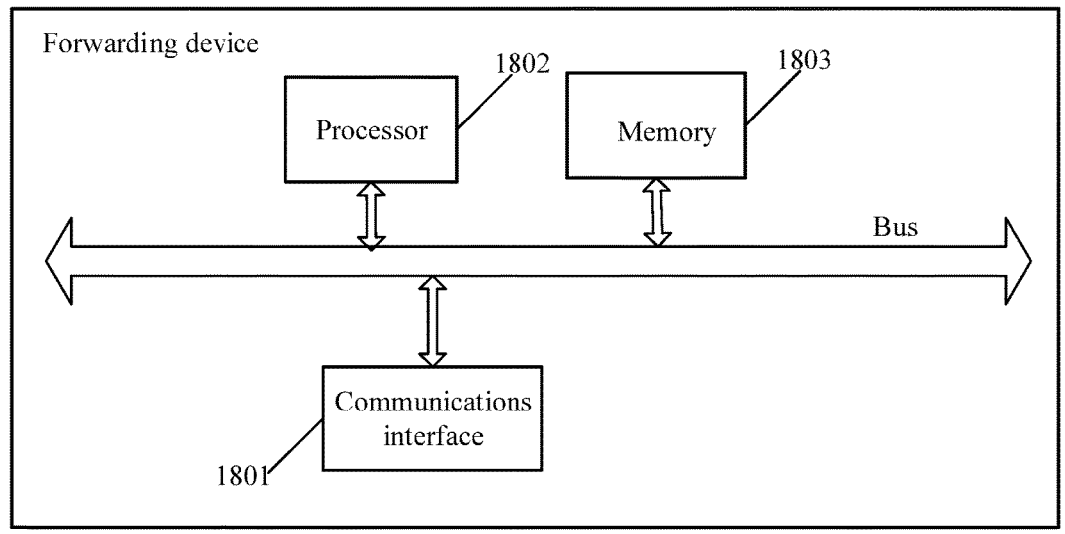
FIG. 18 is a schematic structural diagram of a forwarding device according to an embodiment of the present disclosure.

FIG. 18 is a schematic structural diagram of a forwarding device according to an embodiment of the present disclosure. As shown in FIG. 18, the forwarding device in this embodiment includes a communications interface 1801, a processor 1802, and a memory 1803. The communications interface 1801, the processor 1802, and the memory 1803 are connected with each other using a bus.

The processor 1802 runs a program in the memory 1803, and is configured to perform the following operations of receiving, by the forwarding device, a first packet sent by a network device, where the network device is a first server or a previous-hop device, the previous-hop device is a previous hop of the forwarding device on a link corresponding to a PTPP, the first packet includes the PTPP, and the PTPP is a port sequence that a link from the first server to a second server passes through, obtaining, by the forwarding device, a second packet according to the PTPP included in the first packet, where a PTPP included in the second packet is used to instruct a next hop of the forwarding device to forward a packet, and sending, by the forwarding device, the second packet to the second server using a port indicated by the PTPP included in the first packet.

An implementation principle and a technical effect thereof are similar to that of the forwarding device in the embodiment corresponding to FIG. 12, and details are not described herein. The forwarding device in this embodiment of the present disclosure may be the forwarding device shown in FIG. 15, and details are not described herein again.

The processor 1802 may be a general purpose processor, including a CPU, an NP, or the like, or may be another programmable logic device, a discrete gate or a transistor logic device, or a discrete hardware component.

Figure 19:
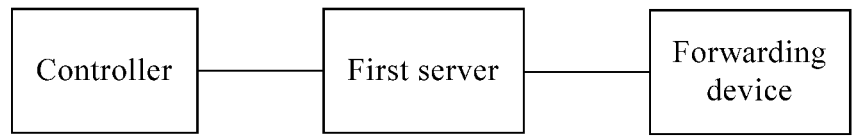
FIG. 19 is a schematic structural diagram of a system for obtaining a port path according to an embodiment of the present disclosure.

FIG. 19 is a schematic structural diagram of a system for obtaining a port path according to an embodiment of the present disclosure. As shown in FIG. 19, the system for obtaining a port path according to this embodiment of the present disclosure includes a controller and a first server. The controller may use a structure of the controller in FIG. 13 or FIG. 16, and correspondingly, the controller may execute the technical solution in the method embodiment in FIG. 1 to FIG. 8. Implementation principles and technical effects thereof are similar, and details are not described herein again. The first server may use a structure of the first server in FIG. 14 or FIG. 17, and correspondingly, the first server may execute the technical solution in the method embodiment in FIG. 9 to FIG. 11. Implementation principles and technical effects thereof are similar, and details are not described herein again.

Optionally, the system further includes a forwarding device. The forwarding device may use a structure of the forwarding device in FIG. 15 or FIG. 18, and correspondingly, may execute the technical solution in the method embodiment in FIG. 12. Implementation principles and technical effects thereof are similar, and details are not described herein again.

In the several embodiments provided in the present application, it should be understood that the disclosed device and method may be implemented in other manners. For example, the described device embodiment is merely an example. For example, the unit or module division is merely logical function division and may be other division in actual implementation. For example, a plurality of units or modules may be combined or integrated into another system, or some features may be ignored or not performed. In addition, the displayed or discussed mutual couplings or direct couplings or communication connections may be implemented through some interfaces. The indirect couplings or communication connections between the devices or modules may be implemented in electronic, mechanical, or other forms.

The modules described as separate parts may or may not be physically separate, and parts displayed as modules may or may not be physical modules, may be located in one position, or may be distributed on a plurality of network units. Some or all the modules may be selected according to actual needs to achieve the objectives of the solutions of the embodiments.

A person of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes any medium that can store program code, such as a read-only memory (ROM), a RAM, a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, a person of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A method for obtaining a port path, comprising:
    receiving, by a controller, a request message from a first server, wherein the request message comprises an identifier of the first server and an identifier of a second server, wherein the request message requests port path information from the controller, and wherein the port path information comprises a port that a logical link from the first server to the second server passes through;
    obtaining, by the controller, a first absolute port path (APP) and a second APP according to network topology information, the identifier of the first server, and the identifier of the second server, wherein the network topology information comprises information about a port connection between the first server and a first forwarding device configured to communicate with the first server, wherein the network topology information further comprises information about a port connection between the second server and a second forwarding device configured to communicate with the second server, wherein the first APP comprises a port that a logical link from a root node to the first server passes through, and wherein the second APP comprises a port that a logical link from the root node to the second server passes through;
    obtaining, by the controller, the port path information according to the first APP and the second APP; and
    sending, by the controller, the port path information to the first server.

2. The method according to claim 1, wherein obtaining the first APP and the second APP comprises:
    obtaining, by the controller, information about the root node, wherein the root node is a node serving as a root of a tree, and wherein leaf nodes of the tree comprise the first forwarding device and the second forwarding device, wherein the information about the root node comprises an identifier of the root node, a seventh port number, and an eighth port number, wherein a port identified by the seventh port number is a port of the root node for communicating with the first server, and wherein a port identified by the eighth port number is a port of the root node for communicating with the second server;
    obtaining, by the controller, the first APP according to the network topology information, the identifier of the first server, and the information about the root node; and
    obtaining, by the controller, the second APP according to the network topology information, the identifier of the second server, and the information about the root node.

3. The method according to claim 2, wherein obtaining the first APP comprises:
    obtaining, by the controller, a first APP set according to the network topology information, the identifier of the first server, and the information about the root node, wherein the first APP set comprises at least one first APP, and wherein the at least one first APP corresponds to the first server; and
    selecting, by the controller, one first APP from the first APP set as the first APP.

4. The method according to claim 3, wherein selecting the one first APP from the first APP set as the first APP comprises selecting, by the controller, the first APP from the first APP set according to link status information of a logical link corresponding to the at least one first APP, wherein the link status information identifies whether congestion occurs on the logical link, and wherein the first APP does not comprise a congested link.

5. The method according to claim 3, wherein obtaining the second APP comprises:
    obtaining, by the controller, a second APP set according to the network topology information, the identifier of the second server, and the information about the root node, wherein the second APP set comprises at least one second APP, and wherein the at least one second APP corresponds to the second server; and
    selecting, by the controller, one second APP from the second APP set as the second APP.

6. The method according to claim 5, wherein selecting the one second APP from the second APP set as the second APP comprises selecting, by the controller, one second APP from the second APP set as the second APP according to the first APP, wherein the second APP and the first APP comprise a same port number, and wherein the same port number is the seventh port number or the eighth port number.

7. The method according to claim 5, wherein selecting the one second APP from the second APP set as the second APP comprises:
    selecting, by the controller, N second APPs from the second APP set according to the first APP, wherein N is an integer greater than or equal to 1, wherein any second APP of the N second APPs and the first APP comprise a same port number, and wherein the same port number is the seventh port number or the eighth port number; and
    selecting, by the controller, the second APP from the N second APPs according to link status information of a logical link corresponding to the N second APPs, wherein the link status information identifies whether congestion occurs on the logical link, and wherein the second APP does not comprise a congested link.

8. The method according to claim 1, wherein the root node is a physical node, wherein the port path information is a packet transport port path (PTPP), and wherein obtaining the port path information comprises:
    removing, by the controller, a redundant portion of the first APP to obtain a third APP, wherein the redundant portion of the first APP is a portion of the first APP other than a port sequence of the first APP, and wherein the port sequence of the first APP comprises the port that the logical link from the root node to the first server passes through;
    removing, by the controller, a redundant portion of the second APP to obtain a fourth APP, wherein the redundant portion of the second APP is a portion of the second APP other than a port sequence of the second APP, and wherein the port sequence of the second APP comprises the port that the logical link from the root node to the second server passes through;
    reversing, by the controller, the third APP to obtain a reversed third APP; and
    splicing, by the controller, the reversed third APP and the fourth APP to obtain the PTPP.

9. The method according to claim 1, wherein the port path information is a packet transport port path (PTPP), and wherein obtaining the port path information comprises:
    removing, by the controller, a redundant portion of the first APP to obtain a third APP, wherein the redundant portion of the first APP is a portion of the first APP other than a port sequence of the first APP, and wherein the port sequence of the first APP comprises the port that the logical link from the root node to the first server passes through;

removing, by the controller, a redundant portion of the second APP to obtain a fourth APP, wherein the redundant portion of the second APP is a portion of the second APP other than a port sequence of the second APP, and wherein the port sequence of the second APP comprises the port that the logical link from the root node to the second server passes through;

removing, by the controller, a same prefix in the third APP and the fourth APP to obtain a fifth APP and a sixth APP, wherein the same prefix is a same port sequence comprised in the third APP and the fourth APP, wherein the fifth APP is a port sequence obtained after the same prefix is removed from the third APP, and wherein the sixth APP is a port sequence obtained after the same prefix is removed from the fourth APP;

reversing, by the controller, the fifth APP to obtain a reversed fifth APP; and splicing, by the controller, the reversed fifth APP and the sixth APP to obtain the PTPP.

10. The method according to claim 9, wherein splicing the reversed fifth APP and the sixth APP to obtain the PTPP comprises:

splicing, by the controller, the reversed fifth APP and the sixth APP to obtain a seventh APP; and removing, by the controller, a port in an odd-numbered location in a port sequence comprised in the seventh APP to obtain the PTPP.

11. The method according to claim 1, wherein the network topology information further comprises information about a port connection between the first forwarding device and a third forwarding device configured to communicate with the first forwarding device and the second forwarding device, and wherein the network topology information further comprises information about a port connection between the third forwarding device and the second forwarding device.

12. The method according to claim 11, further comprising:

receiving, by the controller, a first Link Layer Discovery Protocol (LLDP) message from the third forwarding device, wherein the first LLDP message comprises a third port number, a fourth port number, an identifier of the third forwarding device, and an identifier of the first forwarding device, wherein a port identified by the third port number is a port of the first forwarding device for communicating with the third forwarding device, and wherein a port identified by the fourth port number is a port of the third forwarding device for communicating with the first forwarding device;

receiving, by the controller, a second LLDP message from the third forwarding device, wherein the second LLDP message comprises a fifth port number, a sixth port number, the identifier of the third forwarding device, and an identifier of the second forwarding device, wherein a port identified by the fifth port number is a port of the third forwarding device for communicating with the second forwarding device, and wherein a port identified by the sixth port number is a port of the second forwarding device for communicating with the third forwarding device;

obtaining, by the controller, the information about the port connection between the third forwarding device and the first forwarding device according to the third port number, the fourth port number, the identifier of the third forwarding device, and the identifier of the first forwarding device comprised in the first LLDP message; and obtaining, by the controller, the information about the port connection between the third forwarding device and the second forwarding device according to the fifth port number, the sixth port number, the identifier of the third forwarding device, and the identifier of the second forwarding device comprised in the second LLDP message.

13. The method according to claim 1, further comprising:

receiving, by the controller, a first packet from the first forwarding device, wherein the first packet comprises a first port number, the identifier of the first server, and an identifier of the first forwarding device, and wherein a port identified by the first port number is a port of the first forwarding device for communicating with the first server;

receiving, by the controller, a second packet from the second forwarding device, wherein the second packet comprises a second port number, the identifier of the second server, and an identifier of the second forwarding device, and wherein a port identified by the second port number is a port of the second forwarding device for communicating with the second server;

obtaining, by the controller, the information about the port connection between the first server and the first forwarding device according to the first port number, the identifier of the first server, and the identifier of the first forwarding device comprised in the first packet;

obtaining, by the controller, the information about the port connection between the second server and the second forwarding device according to the second port number, the identifier of the second server, and the identifier of the second forwarding device comprised in the second packet; and obtaining, by the controller, the network topology information according to the information about the port connection between the first server and the first forwarding device and the information about the port connection between the second server and the second forwarding device.

14. The method according to claim 1, further comprising:

obtaining, by the controller, first Dynamic Host Configuration Protocol (DHCP) information allocated by the controller to the first server, wherein the first DHCP information comprises a first port number, the identifier of the first server, and an identifier of the first forwarding device, and wherein a port identified by the first port number is a port of the first forwarding device for communicating with the first server;

obtaining, by the controller, second DHCP information allocated by the controller to the second server, wherein the second DHCP information comprises a second port number, the identifier of the second server, and an identifier of the second forwarding device, and wherein a port identified by the second port number is a port of the second forwarding device for communicating with the second server;

obtaining, by the controller, the information about the port connection between the first server and the first forwarding device according to the first port number, the identifier of the first server, and the identifier of the first forwarding device comprised in the first DHCP information;

obtaining, by the controller, the information about the port connection between the second server and the second forwarding device according to the second port number, the identifier of the second server, and the identifier of the second forwarding device comprised in the second DHCP information; and obtaining, by the controller, the network topology information according to the information about the port connection between the first server and the first forwarding device and the information about the port connection between the second server and the second forwarding device.

15. A method for obtaining a port path, the method comprising:

sending, by a first server, a request message to a controller, wherein the request message comprises an identifier of the first server and an identifier of a second server, wherein the request message requests port path information from the controller, and wherein the port path information comprises a port that a logical link from the first server to the second server passes through;

receiving, by the first server, the port path information from the controller; and obtaining, by the first server, a packet transport port path (PTPP) according to the port path information, wherein the PTPP is a port sequence that the logical link from the first server to the second server passes through, wherein the port path information comprises a first absolute port path (APP) and a second APP, wherein the first APP comprises a port that a logical link from a root node to the first server passes through, wherein the second APP comprises a port that a logical link from the root node to the second server passes through, wherein obtaining the PTPP comprises:

removing, by the first server, a redundant portion of the first APP to obtain a third APP, wherein the redundant portion of the first APP is a portion of the first APP other than a port sequence of the first APP, and wherein the port sequence of the first APP comprises the port that the logical link from the root node to the first server passes through; and removing, by the first server, a redundant portion of the second APP to obtain a fourth APP, wherein the redundant portion of the second APP is a portion of the second APP other than a port sequence of the second APP, and wherein the port sequence of the second APP comprises the port that the logical link from the root node to the second server passes through, wherein the root node is a physical node, and wherein obtaining the PTPP further comprises:

reversing, by the first server, the third APP to obtain a reversed third APP; and splicing, by the first server, the reversed third APP and the fourth APP to obtain the PTPP, or, wherein the root node is a physical node or a virtual node, and wherein obtaining the PTPP comprises:

removing, by the first server, a same prefix in the third APP and the fourth APP to obtain a fifth APP and a sixth APP, wherein the same prefix is a same port sequence comprised in the third APP and the fourth APP, wherein the fifth APP is a port sequence obtained after the same prefix is removed from the third APP, and wherein the sixth APP is a port sequence obtained after the same prefix is removed from the fourth APP;

reversing, by the first server, the fifth APP to obtain a reversed fifth APP; and splicing, by the first server, the reversed fifth APP and the sixth APP to obtain the PTPP.

16. The method according to claim 15, further comprising:

adding, by the first server, the PTPP to a first packet to obtain a second packet, wherein the first packet is a packet from the first server to the second server; and sending, by the first server, the second packet to the second server.

17. The method according to claim 16, wherein adding the PTPP to the first packet to obtain the second packet comprises:

obtaining, by the first server, a path hop count corresponding to the PTPP, wherein a packet header of the first packet comprises a media access control (MAC) field, and wherein the path hop count identifies a location, in the PTPP, of a port that sends the second packet; and adding, by the first server, the PTPP, the path hop count, and a type identifier to the MAC field, and wherein the type identifier indicates that the second packet comprises the PTPP.

18. The method according to claim 16, wherein the second packet comprises a Multiprotocol Label Switching (MPLS) field, and wherein adding the PTPP to the first packet to obtain the second packet comprises adding, by the first server, the PTPP to the MPLS field to obtain the second packet.

19. The method according to claim 15, wherein splicing the reversed fifth APP and the sixth APP to obtain the PTPP comprises:

splicing, by the first server, the reversed fifth APP and the sixth APP to obtain a seventh APP; and removing, by the first server, a port in an odd-numbered location in a port sequence comprised in the seventh APP to obtain the PTPP.

20. A controller, comprising:

a processor; and a non-transitory computer readable medium coupled to the processor and configured to store computer-executable instructions, wherein when executed, the computer-executable instructions cause the processor to be configured to:

receive a request message from a first server, wherein the request message comprises an identifier of the first server and an identifier of a second server, wherein the request message requests port path information from the controller, and wherein the port path information comprises a port that a logical link from the first server to the second server passes through;

obtain a first absolute port path (APP) and a second APP according to network topology information, the identifier of the first server, and the identifier of the second server, wherein the network topology information comprises information about a port connection between the first server and a first forwarding device and information about a port connection between the second server and a second forwarding device, wherein the first forwarding device communicates with the first server, wherein the second forwarding device communicates with the second server, wherein the first APP comprises a port that a logical link from a root node to the first server passes through, and wherein the second APP comprises a port that a logical link from the root node to the second server passes through;

obtain the port path information according to the first APP and the second APP; and send the port path information to the first server.

21. The controller according to claim 20, wherein the computer-executable instructions further cause the processor to be configured to:

obtain a first Dynamic Host Configuration Protocol (DHCP) information allocated by the controller to the first server, wherein the first DHCP information comprises a first port number, the identifier of the first server, and an identifier of the first forwarding device, and wherein a port identified by the first port number is a port of the first forwarding device for communicating with the first server;

obtain a second DHCP information allocated by the controller to the second server, wherein the second DHCP information comprises a second port number, the identifier of the second server, and an identifier of the second forwarding device, and wherein a port identified by the second port number is a port of the second forwarding device for communicating with the second server;

obtain the information about the port connection between the first server and the first forwarding device according to the first port number, the identifier of the first server, and the identifier of the first forwarding device comprised in the first DHCP information;

obtain the information about the port connection between the second server and the second forwarding device according to the second port number, the identifier of the second server, and the identifier of the second forwarding device comprised in the second DHCP information; and obtain the network topology information according to the information about the port connection between the first server and the first forwarding device and the information about the port connection between the second server and the second forwarding device.

22. The controller according to claim 20, wherein the computer-executable instructions further cause the processor to be configured to:

receive a first packet from the first forwarding device, wherein the first packet comprises a first port number, the identifier of the first server, and an identifier of the first forwarding device, and wherein a port identified by the first port number is a port of the first forwarding device for communicating with the first server;

receive a second packet from the second forwarding device, wherein the second packet comprises a second port number, the identifier of the second server, and an identifier of the second forwarding device, and wherein a port identified by the second port number is a port of the second forwarding device for communicating with the second server;

obtain the information about the port connection between the first server and the first forwarding device according to the first port number, the identifier of the first server, and the identifier of the first forwarding device comprised in the first packet;

obtain the information about the port connection between the second server and the second forwarding device according to the second port number, the identifier of the second server, and the identifier of the second forwarding device comprised in the second packet; and obtain the network topology information according to the information about the port connection between the first server and the first forwarding device and the information about the port connection between the second server and the second forwarding device.

23. The controller according to claim 20, wherein when obtaining the first APP and the second APP, the computer-executable instructions further cause the processor to be configured to:

obtain information about the root node, wherein the root node is a node serving as a root of a tree, and wherein leaf nodes of the tree comprise the first forwarding device and the second forwarding device, wherein the information about the root node comprises an identifier of the root node, a seventh port number, and an eighth port number, wherein a port identified by the seventh port number is a port of the root node for communicating with the first server, and wherein a port identified by the eighth port number is a port of the root node for communicating with the second server;

obtain the first APP according to the network topology information, the identifier of the first server, and the information about the root node; and obtain the second APP according to the network topology information, the identifier of the second server, and the information about the root node.

24. The controller according to claim 23, wherein when obtaining the first APP, the computer-executable instructions further cause the processor to be configured to:

obtain a first APP set according to the network topology information, the identifier of the first server, and the information about the root node, wherein the first APP set comprises at least one first APP, and wherein the at least one first APP corresponds to the first server; and select one first APP from the first APP set as the first APP, wherein when selecting the one first APP from the first APP set as the first APP, the computer-executable instructions further cause the processor to be configured to select the first APP from the first APP set according to link status information of a logical link corresponding to the at least one first APP, wherein the link status information identifies whether congestion occurs on the logical link, and wherein the first APP does not comprise a congested link.

25. The controller according to claim 24, wherein when obtaining the second APP, the computer-executable instructions further cause the processor to be configured to:

obtain a second APP set according to the network topology information, the identifier of the second server, and the information about the root node, wherein the second APP set comprises at least one second APP, and wherein the at least one second APP corresponds to the second server; and select one second APP from the second APP set as the second APP, wherein when selecting the one second APP from the second APP set as the second APP, the computer-executable instructions further cause the processor to be configured to select one second APP from the second APP set as the second APP according to the first APP, wherein the second APP and the first APP comprise a same port number, and wherein the same port number is the seventh port number or the eighth port number.

26. The controller according to claim 20, wherein the root node is a physical node, wherein the port path information is a packet transport port path (PTPP), and wherein when obtaining the port path information, the computer-executable instructions further cause the processor to be configured to:

remove a redundant portion of the first APP to obtain a third APP, wherein the redundant portion of the first APP is a portion of the first APP other than a port sequence of the first APP, and wherein the port sequence of the first APP comprises the port that the logical link from the root node to the first server passes through;

remove a redundant portion of the second APP to obtain a fourth APP, wherein the redundant portion of the second APP is a portion of the second APP other than a port sequence of the second APP, and wherein the port sequence of the second APP comprises the port that the logical link from the root node to the second server passes through;

reverse the third APP to obtain a reversed third APP; and splice the reversed third APP and the fourth APP to obtain the PTPP.

27. The controller according to claim 20, wherein the port path information is a packet transport port path (PTPP), and wherein when obtaining the port path information, the computer-executable instructions further cause the processor to be configured to:

remove a redundant portion of the first APP to obtain a third APP, wherein the redundant portion of the first APP is a portion of the first APP other than a port sequence of the first APP, and wherein the port sequence of the first APP comprises the port that the logical link from the root node to the first server passes through;

remove a redundant portion of the second APP to obtain a fourth APP, wherein the redundant portion of the second APP is a portion of the second APP other than a port sequence of the second APP, and wherein the port sequence of the second APP comprises the port that the logical link from the root node to the second server passes through;

remove a same prefix in the third APP and the fourth APP to obtain a fifth APP and a sixth APP, wherein the same prefix is a same port sequence comprised in the third APP and the fourth APP, wherein the fifth APP is a port sequence obtained after the same prefix is removed from the third APP, and wherein the sixth APP is a port sequence obtained after the same prefix is removed from the fourth APP;

reverse the fifth APP to obtain a reversed fifth APP; and splice the reversed fifth APP and the sixth APP to obtain the PTPP.

28. The controller according to claim 27, wherein when splicing the reversed fifth APP and the sixth APP to obtain the PTPP, the computer-executable instructions further cause the processor to be configured to:

splice the reversed fifth APP and the sixth APP to obtain a seventh APP; and remove a port in an odd-numbered location in a port sequence comprised in the seventh APP to obtain the PTPP.

29. The controller according to claim 20, wherein the network topology information further comprises information about a port connection between a third forwarding device and the first forwarding device and information about a port connection between the third forwarding device and the second forwarding device, wherein the third forwarding device communicates with both the first forwarding device and the second forwarding device, and wherein the computer-executable instructions further cause the processor to be configured to:

receive a first Link Layer Discovery Protocol (LLDP) message from the third forwarding device, wherein the first LLDP message comprises a third port number, a fourth port number, an identifier of the third forwarding device, and an identifier of the first forwarding device, wherein a port identified by the third port number is a port of the first forwarding device for communicating with the third forwarding device, and wherein a port identified by the fourth port number is a port of the third forwarding device for communicating with the first forwarding device;

receive a second LLDP message from the third forwarding device, wherein the second LLDP message comprises a fifth port number, a sixth port number, the identifier of the third forwarding device, and an identifier of the second forwarding device, wherein a port identified by the fifth port number is a port of the third forwarding device for communicating with the second forwarding device, and wherein a port identified by the sixth port number is a port of the second forwarding device for communicating with the third forwarding device;

obtain the information about the port connection between the third forwarding device and the first forwarding device according to the third port number, the fourth port number, the identifier of the third forwarding device, and the identifier of the first forwarding device comprised in the first LLDP message; and obtain the information about the port connection between the third forwarding device and the second forwarding device according to the fifth port number, the sixth port number, the identifier of the third forwarding device, and the identifier of the second forwarding device comprised in the second LLDP message.

30. A first server, comprising:

a processor; and a non-transitory computer readable medium coupled to the processor and configured to store computer-executable instructions, wherein when executed, the computer-executable instructions cause the processor to be configured to:

send a request message to a controller, wherein the request message comprises an identifier of the first server and an identifier of a second server, wherein the request message requests port path information from the controller, and wherein the port path information comprises a port that a logical link from the first server to the second server passes through;

receive the port path information from the controller; and obtain a packet transport port path (PTPP) according to the port path information, and wherein the PTPP is a port sequence that the logical link from the first server to the second server passes through, wherein the port path information comprises a first absolute port path (APP) and a second APP, wherein the first APP comprises a port that a logical link from a root node to the first server passes through, wherein the second APP comprises a port that a logical link from the root node to the second server passes through, and wherein when obtaining the PTPP, the computer-executable instructions further cause the processor to be configured to:

remove a redundant portion of the first APP to obtain a third APP, wherein the redundant portion of the first APP is a portion of the first APP other than a port sequence of the first APP, and wherein the port sequence of the first APP comprises the port that the logical link from the root node to the first server passes through; and remove a redundant portion of the second APP to obtain a fourth APP, wherein the redundant portion of the second APP is a portion of the second APP other than a port sequence of the second APP, and wherein the port sequence of the second APP comprises the port that the logical link from the root node to the second server passes through, wherein the root node is a physical node, and wherein when obtaining the PTPP, the computer-executable instructions further cause the processor to be configured to:

reverse the third APP to obtain a reversed third APP; and splice the reversed third APP and the fourth APP to obtain the PTPP, or, wherein the root node is a physical node or a virtual node, and wherein when obtaining the PTPP, the computer-executable instructions further cause the processor to be configured to:

remove a same prefix in the third APP and the fourth APP to obtain a fifth APP and a sixth APP, wherein the same prefix is a same port sequence comprised in the third APP and the fourth APP, wherein the fifth APP is a port sequence obtained after the same prefix is removed from the third APP, and wherein the sixth APP is a port sequence obtained after the same prefix is removed from the fourth APP;

reverse the fifth APP to obtain a reversed fifth APP; and splice the reversed fifth APP and the sixth APP to obtain the PTPP.

31. The first server according to claim 30, wherein the computer-executable instructions further cause the processor to be configured to:

add the PTPP to a first packet to obtain a second packet, wherein the first packet is a packet from the first server to the second server; and send the second packet to the second server.

32. The first server according to claim 31, wherein when adding the PTPP to the first packet to obtain the second packet, the computer-executable instructions further cause the processor to be configured to:

obtain a path hop count corresponding to the PTPP, wherein a packet header of the first packet comprises a media access control (MAC) field, and wherein the path hop count identifies a location, in the PTPP, of a port that sends the second packet; and add the PTPP, the path hop count, and a type identifier to the MAC field, and wherein the type identifier indicates that the second packet comprises the PTPP.

33. The first server according to claim 31, wherein the second packet comprises a Multiprotocol Label Switching (MPLS) field, and wherein when adding the PTPP to the first packet to obtain the second packet, the computer-executable instructions further cause the processor to be configured to add the PTPP to the MPLS field to obtain the second packet.

34. The first server according to claim 30, wherein when splicing the reversed fifth APP and the sixth APP to obtain the PTPP, the computer-executable instructions further cause the processor to be configured to:

splice the reversed fifth APP and the sixth APP to obtain a seventh APP; and remove a port in an odd-numbered location in a port sequence comprised in the seventh APP to obtain the PTPP.

* * * * *